United States Patent
Kvalheim

(10) Patent No.: US 7,422,135 B2
(45) Date of Patent: Sep. 9, 2008

(54) FASTENER DISPENCER AND APPLICATOR

(75) Inventor: Andrew M. Kvalheim, Petaluma, CA (US)

(73) Assignee: Kval, Inc., Petaluma, CA (US)

( * ) Notice: Subject to any disclaimer, the term of this patent is extended or adjusted under 35 U.S.C. 154(b) by 0 days.

(21) Appl. No.: 11/521,187

(22) Filed: Sep. 13, 2006

(65) Prior Publication Data

US 2008/0061103 A1    Mar. 13, 2008

(51) Int. Cl.
*B65H 1/00* (2006.01)
(52) U.S. Cl. ................................ 227/107; 227/109
(58) Field of Classification Search ................ 227/107, 227/109, 111, 114, 119
See application file for complete search history.

(56) References Cited

U.S. PATENT DOCUMENTS

| | | | |
|---|---|---|---|
| 3,221,967 A | | 12/1965 | McKenzie et al. |
| 3,269,594 A | | 8/1966 | McKenzie et al. |
| 3,344,827 A | * | 10/1967 | Kvalheim et al. ......... 144/144.1 |
| 3,580,792 A | * | 5/1971 | Kvalheim et al. ........... 156/546 |
| 3,772,757 A | | 11/1973 | Goldstein |
| 3,889,343 A | | 6/1975 | Miller et al. |
| 3,930,808 A | | 1/1976 | Miller et al. |
| 4,776,242 A | | 10/1988 | Poux et al. |
| 5,222,290 A | | 6/1993 | Kvalheim |
| 5,285,567 A | * | 2/1994 | Thuswaldner ................. 29/786 |
| 5,326,201 A | * | 7/1994 | King ........................... 409/251 |
| 5,331,732 A | * | 7/1994 | Kvalheim ...................... 29/787 |
| 5,425,473 A | * | 6/1995 | Kvalheim .................... 221/188 |
| 5,480,087 A | | 1/1996 | Young et al. |
| 5,918,789 A | * | 7/1999 | Olvera et al. ................. 227/119 |
| 6,106,446 A | * | 8/2000 | Kelly et al. .................... 483/28 |
| 6,162,009 A | * | 12/2000 | Kvalheim ................. 414/798.1 |
| 6,565,496 B1 | * | 5/2003 | LaPlante et al. ................ 483/1 |
| 7,273,157 B2 | * | 9/2007 | Kvalheim ...................... 221/68 |
| 2005/0077310 A1 | * | 4/2005 | Kvalheim ...................... 221/68 |
| 2007/0170198 A1 | * | 7/2007 | Kvalheim ...................... 221/92 |

* cited by examiner

*Primary Examiner*—Brain D Nash
(74) *Attorney, Agent, or Firm*—Corwin R. Horton

(57) ABSTRACT

Apparatus for handling and feeding of groups of fasteners such as screws to an applicator or applicators for applying workpieces such as hinges to a base at a series of worksites. A dispenser at a charging site receives from a fastener feeder a charge of the groups of fasteners needed at all of the worksites of the series and then moves consecutively to each of the worksites to dispense a group of fasteners to an applicator at each worksite. A plurality of passageways extend from a fastener receiving side at the top to a fastener discharge side at the bottom of the dispenser, one passageway for each fastener to be dispensed. The discharge ends of the passageways register with receiving apertures at the applicator at each site. A series of gates at positions along the passageways selective hold and release groups of fasteners at their respective positions.

14 Claims, 20 Drawing Sheets

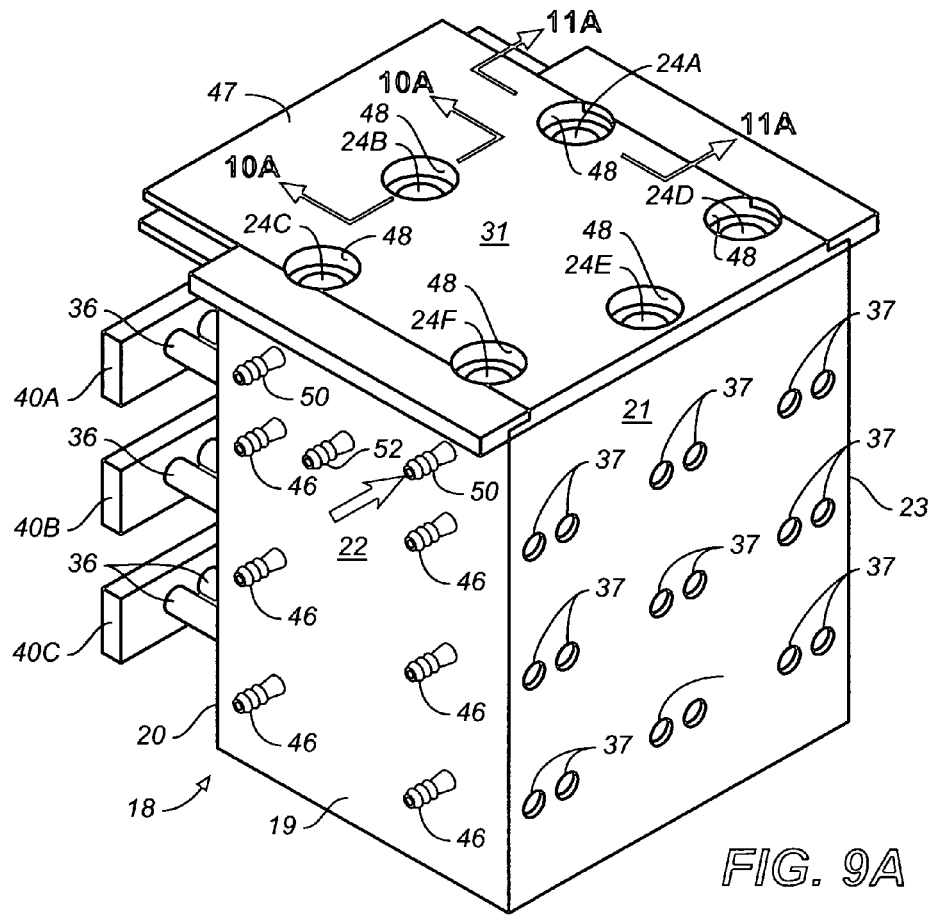
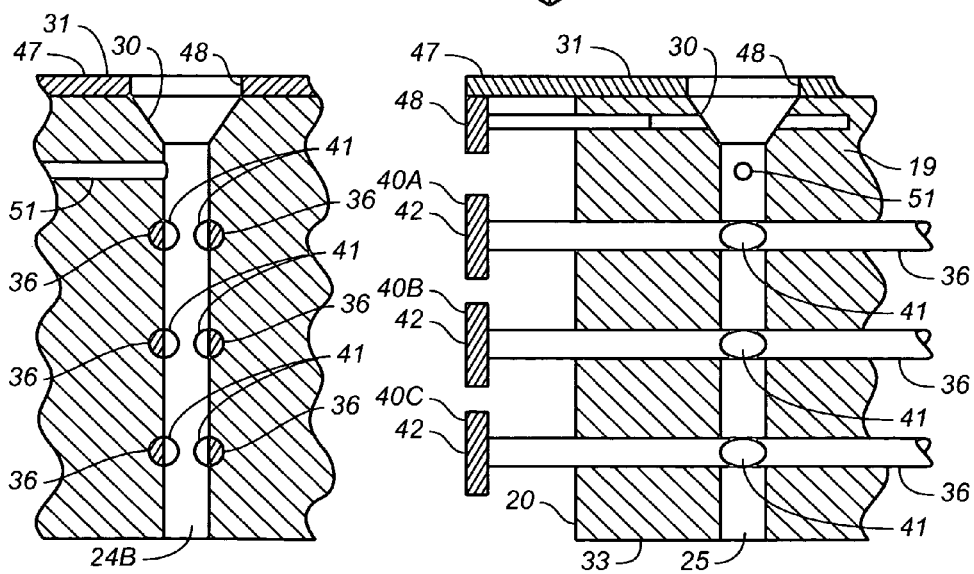
FIG. 9A
FIG. 10A
FIG. 11A

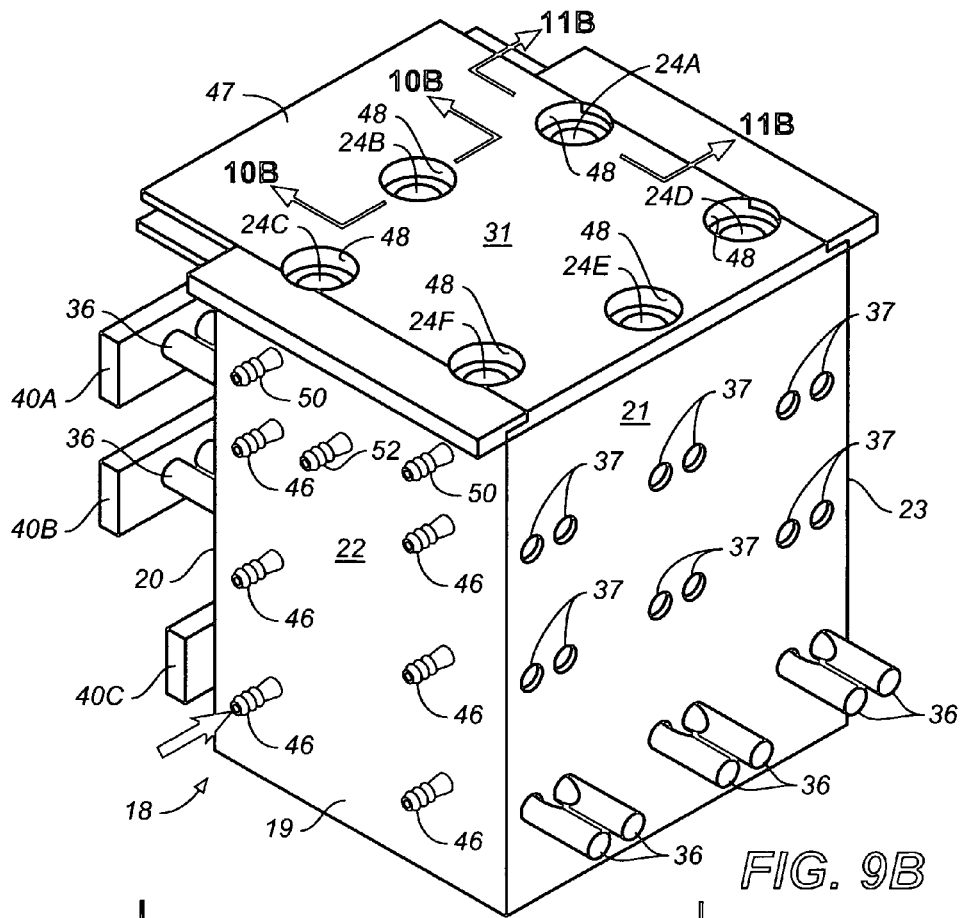
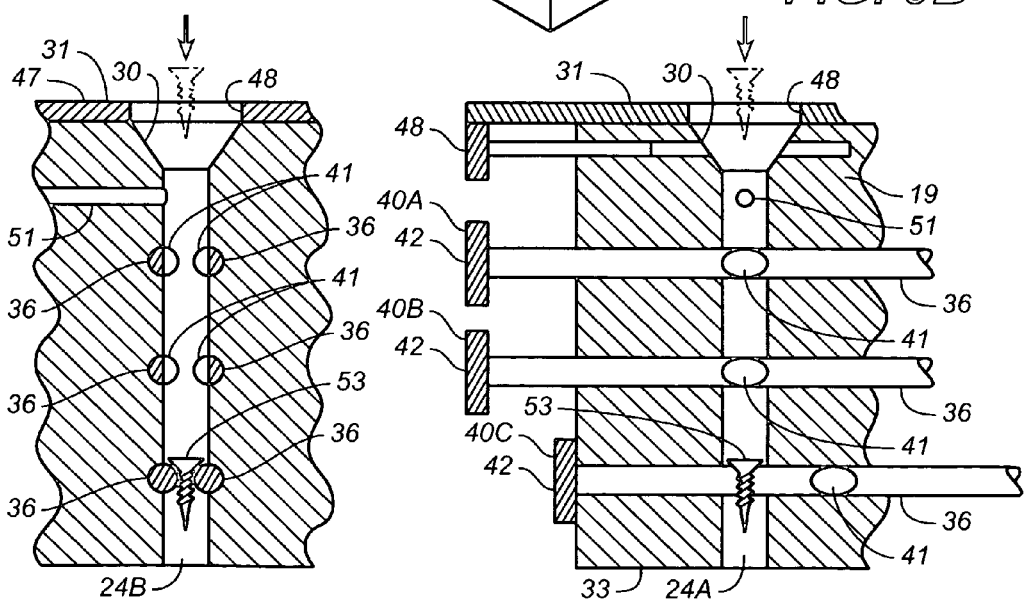
FIG. 9B
FIG. 10B
FIG. 11B

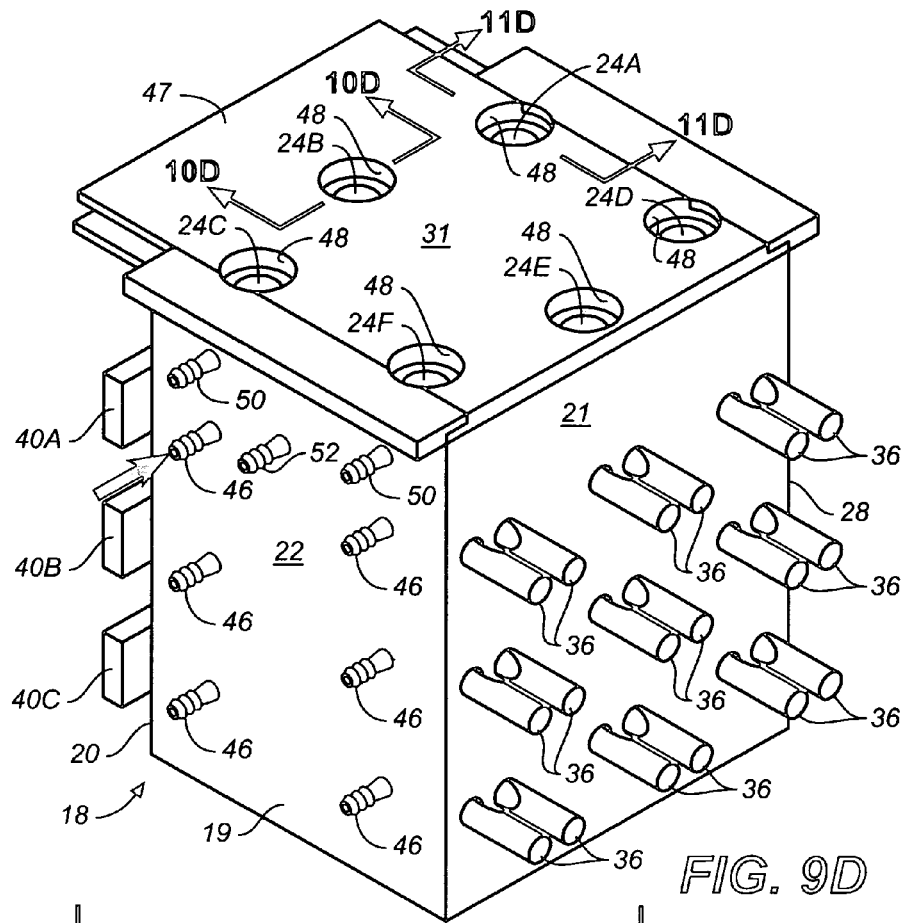
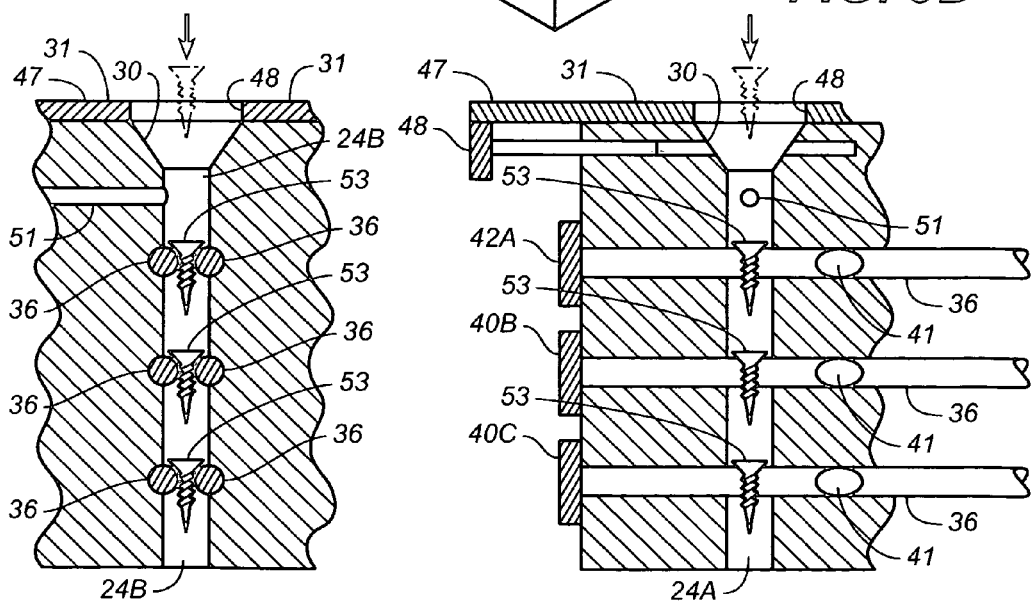
FIG. 10D
FIG. 11D

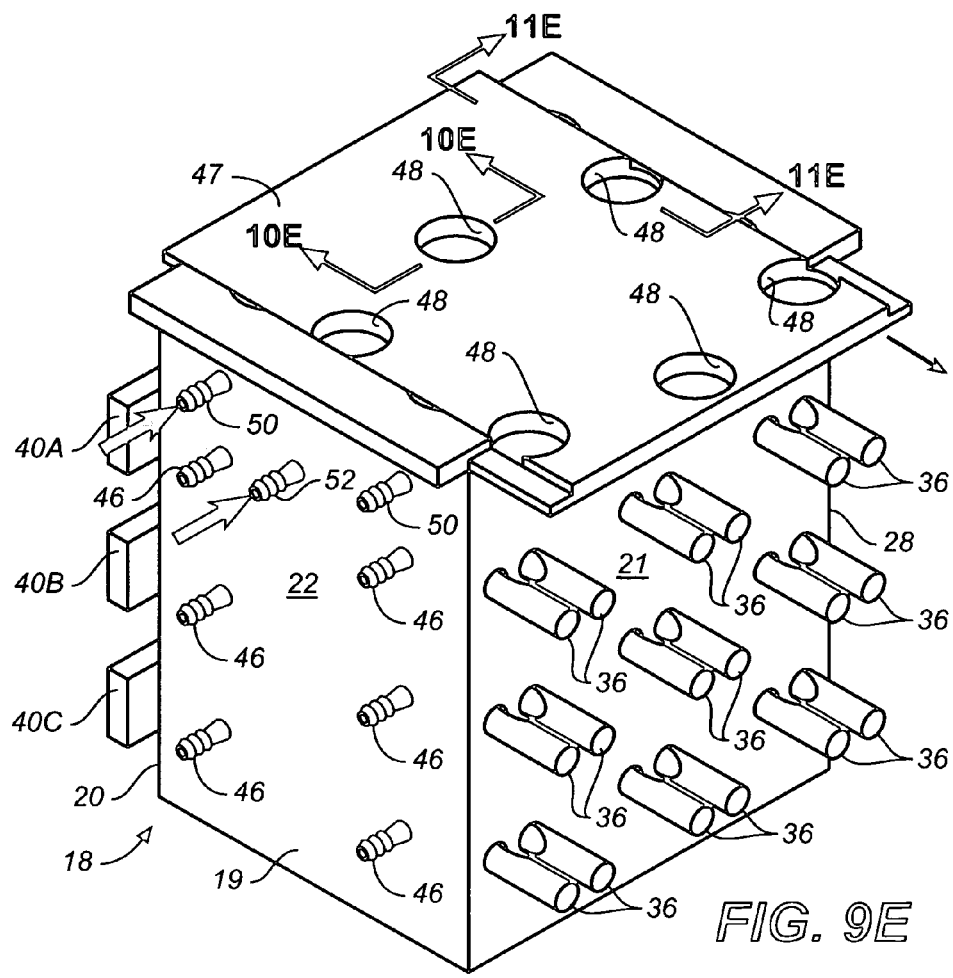
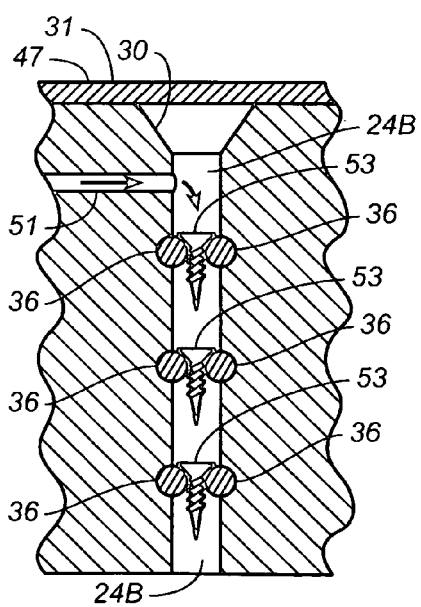
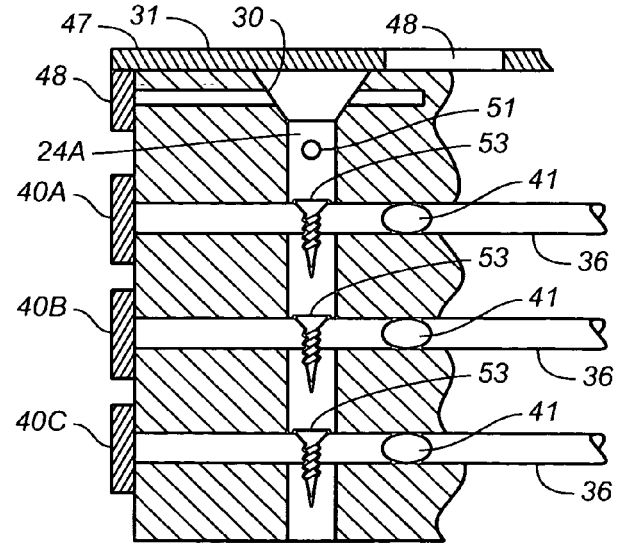
FIG. 9E
FIG. 10E
FIG. 11E

FASTENER DISPENCER AND APPLICATOR

BACKGROUND OF THE INVENTION

This invention relates generally to handling fasteners such as screws and the like for their use in automated fastening operations. More specifically this invention concerns feeding of fasteners such as screws in sequential groups and particularly to feeding groups of fasteners in a sequence to an applicator for applying a workpiece with each group of fasteners to a base or substrate at each of a series of sites.

Various implements are utilized for automatically applying fasteners to a workpiece and they often require the delivery of fasteners to an applicator implement or implements at a single worksite to carry out the fastening operation at that worksite. One such application is described in U.S. Pat. No. 3,221,967 to MacKenzie et al. in which groups of nails are serially fed to a nailing die that holds them against the outsole of a shoe at an attaching station at which the nails are driven through the heel and into the heel portion of an outsole. This application requires only one fastening location. However, in some applications it is desirable to deliver groups of fasteners to each of a multiple number of fastening locations at the same time.

One such application is found in equipment for automatically applying fasteners between doors and door jambs. In this application a multiple number of screws must be driven into the door and adjacent jamb through the openings in each hinge leaf, usually three or more for each leaf.

In such hinging equipment screws are first collated from a collection in an overhead screw box and a group individual screws are then fed simultaneously from the box, each through a separate tube to one of the hinge openings for driving therethrough by a driving implement into the door or jamb. In order to apply hinges at multiple locations along the side of the door, stationary hinging equipment is provided for each location or a single hinger is mounted on a carriage for movement between each hinging site to apply all of the hinges consecutively.

In the carriage-mounted hinger the screw box is mounted on the carriage above the driving implement at the hinge openings and moves between hinging sites with the rest of the hinging equipment on the carriage. The screw box necessarily contributes a substantial amount of mass and weight to carriage and thus may limit the speed and accuracy of performance of the hinger functions. Thus, it would be desirable have a rapid screw supply to the hinging equipment on the carriage without requiring the screw box to be on the carriage.

Another approach for delivering a series of fasteners simultaneously to a workplace is seen in U.S. Pat. No. 5,480,087. In this approach, a vibrating feed hopper collates screws and delivers them in a column down a delivery chute to an outlet confronting a slide assembly extending normal to the chute that is mounted for movement between a ready position to one side of the chute and a dump position to the other side. The slide assembly contains a series of compartments spaced along its length each for receiving and holding a screw from the delivery chute. When the slide assembly moves from the dump position to the ready position it moves past the end of the delivery chute and each compartment of the slide assembly receives a screw from the chute. When the slide assembly returns to the dump position the screws are simultaneously released through the bottom of their compartments each into its own delivery tube, for delivery to a separate screwdriver at a workplace.

The foregoing delivery system is essentially equivalent in result to the screw hopper arrangement described for the hinger application in that a mass of random screws are organized and simultaneously discharged in groups, each through a separate delivery tube, to a workplace. Adapted for the carriage-mounted hinger operation earlier described, this system, including its feed hopper, must be mounted on the carriage, with the attendant weight and mass shortcomings mentioned for the screw box delivery system. Moreover, in this system the screws must be inserted into the slide assembly one by one, with attendant delay. Also, the slide assembly is only capable of holding one charge of screws for the delivery tubes and must return to the ready position after each dump.

SUMMARY OF THE INVENTION

This invention relates to the handling and feeding of groups of fasteners to an applicator or applicators for applying workpieces to a base or substrate and particularly for application of the workpieces at a series of worksites. In this invention a dispenser at a charging site receives a charge of the groups of fasteners needed at all of the worksites of the series and then moves consecutively to each of the worksites to dispense a group of fasteners to an applicator at each worksite.

In one embodiment an applicator is permanently stationed at each of the multiple worksites and the dispenser is moved from the charging site consecutively to each worksite to dispense a group of fasteners to each of the applicators at each of the worksites.

However, in the preferred embodiment only a single applicator is employed and this applicator moves with the dispenser to each of the worksites to sequentially dispense groups of fasteners to that single dispenser for application to each of the worksites.

The invention may be employed for fastening, at multiple sites, brackets, claddings, laminae and other mountings and other workpieces requiring groups of fasteners at multiple sites but it especially concerns feeding of groups of screws to a hinge applicator mounted on a shuttle or carriage for movement along a juxtaposed door and door jamb for applying hinges at a plurality of worksites therealong.

For the foregoing and other potential applications, this invention permits the feeding of a series of groups of fasteners to an applicator or applicators for applying workpieces at a series of worksites with a lightweight shuttle dispenser without the need to transport to those worksites a heavy and bulky hopper required for collating and feeding groups of fasteners.

For application of workpieces requiring multiple fasteners to secure, typically the fasteners are to be applied in a pattern (spacing and location) most appropriate to the size and character of the workpiece. For example, hinges require screws to be applied in a pattern corresponding to the location of the screw holes of the hinge leaves of the open hinge to be applied. Advantageously, for this purpose in the invention an applicator may be used that has an appliance capable of receiving a group of fasteners from the dispenser and holding each fastener in the group at a predetermined location at the site of application that conforms to the application pattern needed for the particular workpiece and base.

Advantageously in the invention to supply a fastener feeder is used that is capable of collating and dispensing separate groups of fasteners with each fastener fed to a separate location for communication with a separate passageway of a dispenser to be charged with fasteners.

The dispensers of the invention, discussed more fully below, are desirably provided with a number of chambers or passageways, that extend from a fastener receiving side at the top to a fastener discharge side at the bottom of the dispenser, one passageway for each fastener to be dispensed. The locations of the discharge ends of the passageways at the bottom of the dispenser desirably correspond to the pattern of the predetermined locations at which the applicator at the worksite holds the fasteners. In this fashion there is an ease of communication and flow of fasteners from the dispenser to the appliance and permits the appliance to apply the fasteners at the worksite in the pattern needed for the particular workpiece and base.

The separate location each of the fasteners fed by the fastener feeder to the dispenser at the charging desirably correspond to the location of a respective passageway at the top of the dispenser. This permits easy communication and flow from the fastener feeder to the dispenser.

The dispenser is desirably carried on a shuttle and travels first to the charging site to be charged with groups of fasteners sufficient to dispense a group at each worksite. The shuttle then moves consecutively to each of the worksites and at each worksite the dispenser dispenses a group of fasteners to an applicator at that worksite. The shuttle then returns to the charging site to begin a new cycle.

As indicated, in the preferred embodiment a single applicator is employed that moves between the worksites to apply a workpiece at each. Advantageously this applicator is carried on a shuttle, together with the dispenser, for this purpose. The dispenser receives and holds the requisite number of groups of fasteners and is capable of serially dispensing the groups. A particular dispenser of this invention is comprised of a series of passageways that comprise chambers for holding discrete groups of fasteners. The passageways extend from a receiving side, at which a fastener feeder feeds fasteners to each passageway, to a discharge side, at which the groups of fasteners may be dispensed to an appliance for application at a worksite.

Between the receiving and discharge side of the dispenser are a series of gates for all of the passageways, each gate at a position spaced from the positions of the other gates sufficiently to permit fasteners held at a gate to be beyond the position of the next previous gate. Each gate may be individually and selectively actuated to either open all of the passageways at its position to the flow of fasteners past that position or to stop fasteners in all of the passageways at its position. This dispenser may be charged by first dosing off the gate closest to the discharge side while opening all of the other gates. The fastener feeder then feeds one group of fasteners into the passageways at the receiving side of the dispenser, one fastener per passageway. The next adjacent gate is then closed and another group of fasteners similarly fed into the passageways. These steps are repeated sequentially for each gate toward the receiving side to create a "stack" of fastener groups. The groups of fasteners may then be sequentially dispensed from dispenser by sequentially opening the gates, starting with the gate closest to the discharge side.

Another feature of the dispenser of this invention provides a mode of propelling the fasteners through the passageways. In this feature a selectively operable closure is provided for the passageways at the receiving side of the dispensers or a position between the receiving side and the first gate position. Also, air ducts or the like are provided for introducing air under pressure to the passageways at a position along the passageways between the closure position and the first gate position.

Yet another feature of the dispenser that may be used in this invention is a type of gate closure that is particularly useful in dispensing screws or other fasteners which have enlarged heads, larger than the shanks of the fastener. Such a closure constricts the passageway at gate position to a degree that the shank of the fastener still passes the gate position but fastener head is retained by constriction. When all of the fasteners fed to the dispenser passageways the fasteners may be collected at each dosed gate position with the fasteners all aligned with the passage direction. This decreases the possibility of jams. Such constrictions may be created by intersecting the passageway with projections at the periphery of the passageway at the gate location. In particular a pair of spaced-apart rods may be inserted, one to either side of the passageway.

BRIEF DESCRIPTION OF THE DRAWINGS

FIG. 9A is the same isometric view of the dispenser as FIG. 5 but showing all three gates in disengaged mode;

FIG. 10A is a fragmentary sectional view of the dispenser of FIG. 9A taken along lines 10A-10A in FIG. 9A showing details of a screw passageway and the gate rods at the passageway;

FIG. 11A is a fragmentary sectional view of the dispenser of FIG. 9A taken along lines 11A-11A in FIG. 9A, in a direction perpendicular to the view of FIG. 10 A, showing details of a screw passageway and the gate rods at the passageway;

FIG. 9B is the same isometric view of the dispenser as FIG. 5 but showing upper and midlevel gate in disengaged mode and the lower level gate engaged;

FIG. 10B is a fragmentary sectional view of the dispenser of FIG. 9B taken along lines 10B-10B in FIG. 9B showing details of a screw passageway and the gate rods at the passageway;

FIG. 11B is a fragmentary sectional view of the dispenser of FIG. 9B taken along lines 11B-11B in FIG. 9B, in a direction perpendicular to the view of FIG. 10 B, showing details of a screw passageway and the gate rods at the passageway;

FIG. 9D is the same isometric view of the dispenser as FIG. 5 but showing the gates at all three levels in the engaged mode;

FIG. 10D is a fragmentary sectional view of the dispenser of FIG. 9D taken along lines 10D-10D in FIG. 9D showing details of a screw passageway and the gate rods at the passageway;

FIG. 11D is a fragmentary sectional view of the dispenser of FIG. 9D taken along lines 11D-11D in FIG. 9D, in a direction perpendicular to the view of FIG. 10D, showing details of a screw passageway and the gate rods at the passageway;

FIG. 9E is the same isometric view of the dispenser as FIG. 9D but showing the dispenser slide cover at the closed position with the openings therein out of register with the screw passageways and dosing off the passageways;

FIG. 10E is a fragmentary sectional view of the dispenser of FIG. 9E taken along lines 10E-10E in FIG. 9E showing details of a screw passageway and the gate rods at the passageway;

FIG. 11E is a fragmentary sectional view of the dispenser of FIG. 9E taken along lines 11E-11E in FIG. 9E, in a direction perpendicular to the view of FIG. 10D, showing details of a screw passageway and the gate rods at the passageway;

DETAILED DESCRIPTION OF THE PREFERRED EMBODIMENT

The following description illustrates the manner in which the principles of the invention are applied but is not to be construed as limiting the scope of the invention.

The dispenser or downloader of this invention is intended for dispensing fasteners, especially, to locations where the fasteners may be employed, as by installing, driving or other manipulation, to serve an intended purpose and particularly for fastening a workpiece to a base or substrate. As a part of this invention the dispensers may be incorporated into workstations for fabricating structures utilizing the dispensed fasteners.

The dispensers of this invention are particularly useful in connection with workstations for fabricating door and door jamb units in which hinges are secured to doorjambs by means of screws or the like. In the prior art these workstations typically incorporate automatic hingers for application of hinges at locations along the door edge and jamb surface. Such hingers may be mounted for operation on a carriage for movement to traverse to the hinge sites along the door edge for applying hinges to doors and door jambs at those sites, such as described in my U.S. Pat. No. 5,222,290 (Patent '290). The hingers on the carriages of those workstations typically include a screw feeder, a hinge feeder, a hinge and screw applicator and screwdrivers for fastening the hinges with screws at the application sites.

Figure 1:
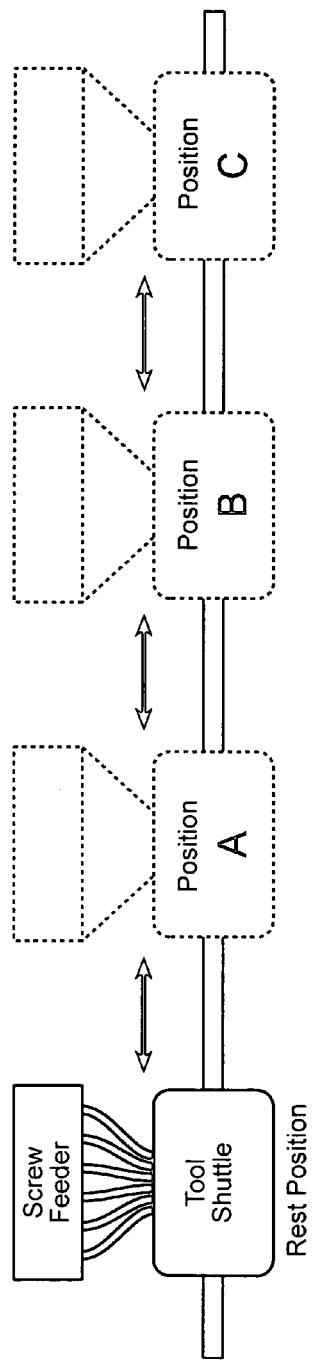
FIG. 1 is a schematic side view of a prior art carriage or shuttle for dispensing screws for application at multiple worksites with the rest position shown in solid lines and three application sites, positions A, B and C, in dotted outline.

Referring to the drawings FIG. 1 illustrates such prior art workstations. A shuttle or carriage is mounted for movement between a home position, at which the carriage is idle, and hinging sites, positions A, B and C, at each of which the carriage may be stopped for application of a hinge to an adjacent door edge and jamb face. A screw feeder is mounted above the shuttle and travels with it to the application sites to feed screws to the hinger at each site. The screw feeder first collates screws from a haphazard aggregation of screws and then dispenses the required number of collated screws, each through a separate tube to a separate location at a screw and hinge applicator on the carriage. For this purpose the screw feeder typically requires a heavy box or cylinder that must be mounted for oscillation or vibration in order to collate and dispense the screws.

Figure 2:
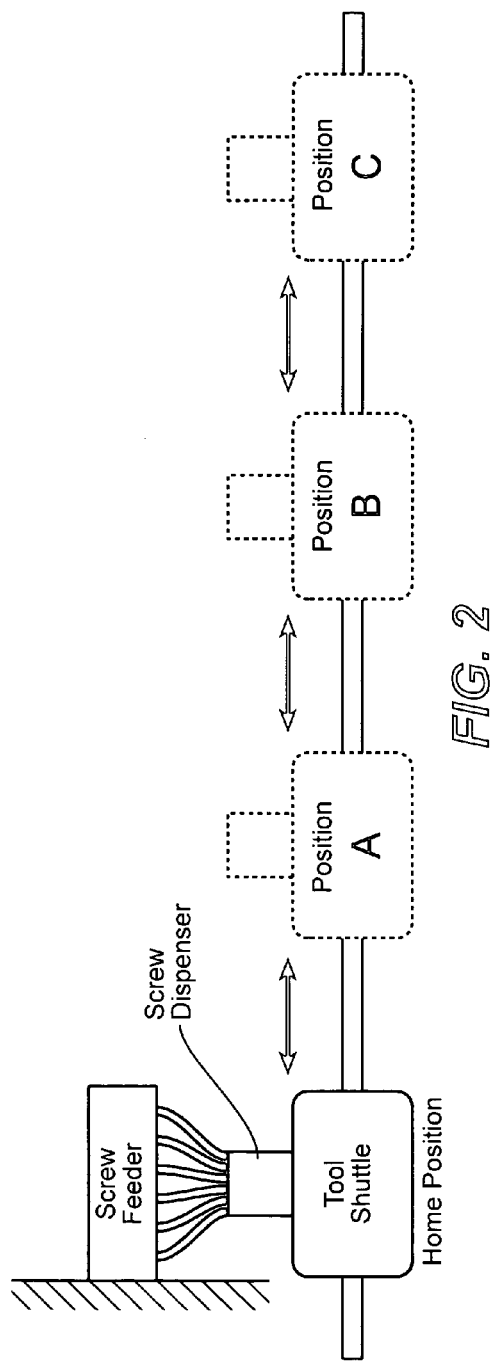
FIG. 2 is a schematic side view of a carriage or shuttle of this invention for dispensing screws for application at multiple worksites with the home position shown in solid lines and three application sites, positions A, B and C, in dotted outline.

By contrast, with workstations according to this invention, as seen in FIG. 2, the screw feeder is stationed permanently at a home position and a screw dispenser of this invention is mounted on the tool carriage. While the carriage is at the home position, the screw dispenser may be charged by the screw feeder with sufficient screws for supplying the hinger to apply hinges at each of the hinge positions, A, B and C. The carriage then returns to the home position for recharging with screws to carry out the next cycle.

For carrying out this function, the screw dispenser has the ability to receive and carry to each of the hinge sites the appropriate number of screws and to dispense the required number of screws, at or about the same time, at each site, each to the desired location at that site for that screw.

A typical hinge applicator workstation has a screw and hinge applicator that applies the hinge to the door and jamb surfaces together with the screws which are then driven by screwdrivers. For such workstations the screw dispenser typically dispenses to the applicator, usually each into a respective recess in the applicator that registers with a hinge screw hole location in a hinge adjacent to the applicator.

Figure 3A:
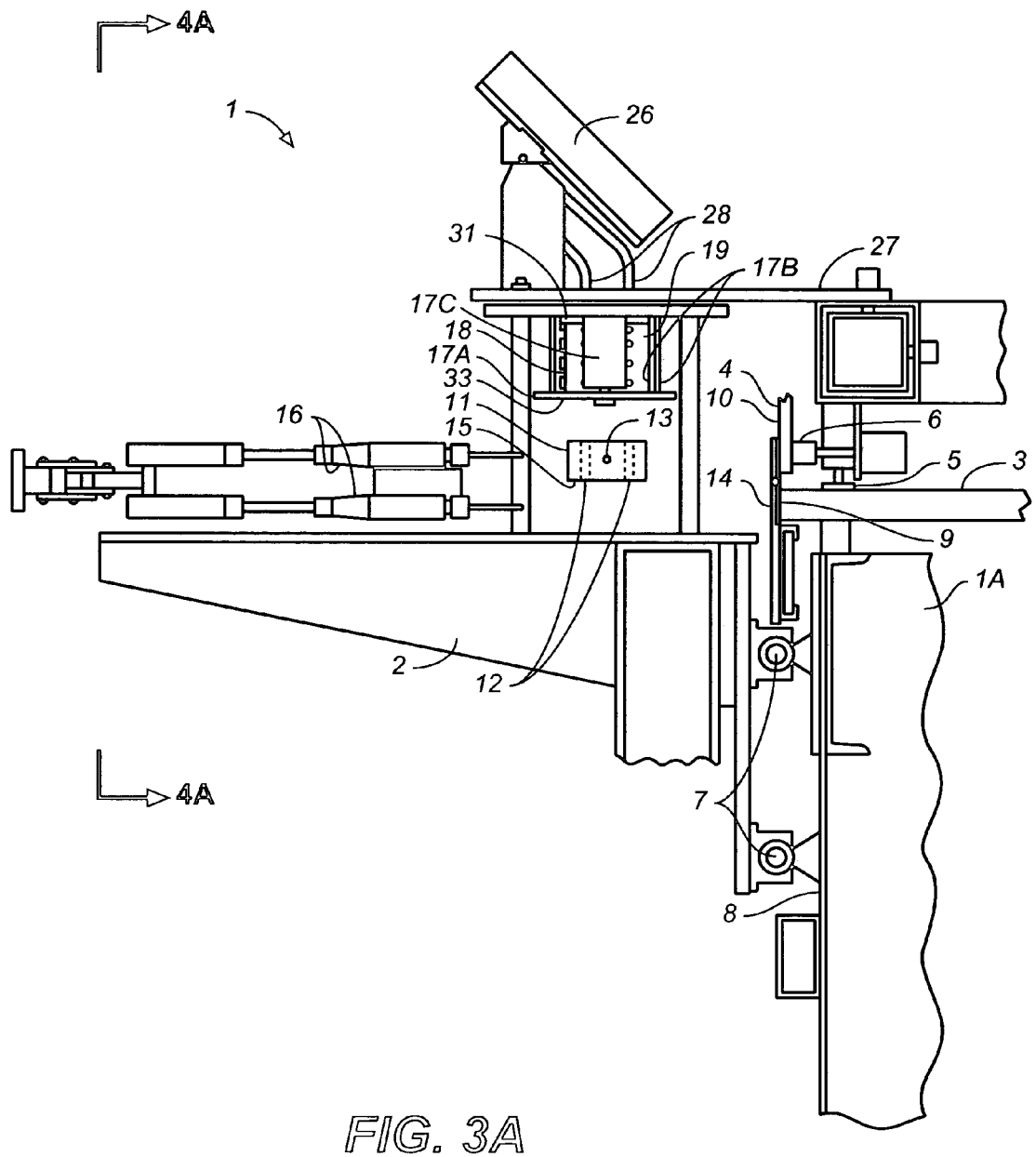
FIG. 3A is a fragmentary side view of a workstation of this invention for applying hinges to doors and door jambs, including a carriage carrying automatic screw drivers, a hinge and screw applicator and a screw dispenser of this invention for feeding screws for application to the hinges. In this view the carriage is located at a home position with the dispenser elevated to receive screws from a screw dispenser located at the home position.

FIGS. 3A through 4C illustrate the relevant portions of such a workstation. With reference to these figures, a support frame 1A of a workstation 1 is provided to secure and position a door 3 and door jamb 4 for application of hinges and upon which shuttle carriage 2 is mounted as will be described. As seen in FIGS. 3A through 3C, door damps 5 and jamb damps 6 secure door 3 and jamb 4, respectively, in position with the side edge 9 of door 3 and jamb face 10 juxtaposed in spaced relationship for applying hinges therebetween with one hinge leaf at the face of the jamb and the other at the door side.

Carriage 2 is mounted by rails 7 on support frame 1A for movement on the rails along the front side 8 of frame 1A so that the hinging equipment on the carriage 2 held on frame 1A.

Various equipment may be mounted on the carriage including equipment to feed, hold and apply the hinges and to feed, hold and drive screws through the hinges to fix them to the door edge and jamb face. Equipment (not shown) may also be placed on the carriage for preparing the door edge and jamb face for receiving the hinges and for drilling the screw holes or this may be done in a separate operation.

As shown in FIGS. 3A through 4C, a screw and hinge applicator block 11 may be mounted on the carriage for rotation and lateral movement as will be described. Block 11 is an appliance that has screw-receiving passages 12 for receiving, holding and allowing passage therethrough of screws driven by screwdrivers, as shown more fully in Patent '290.

Figure 3B:
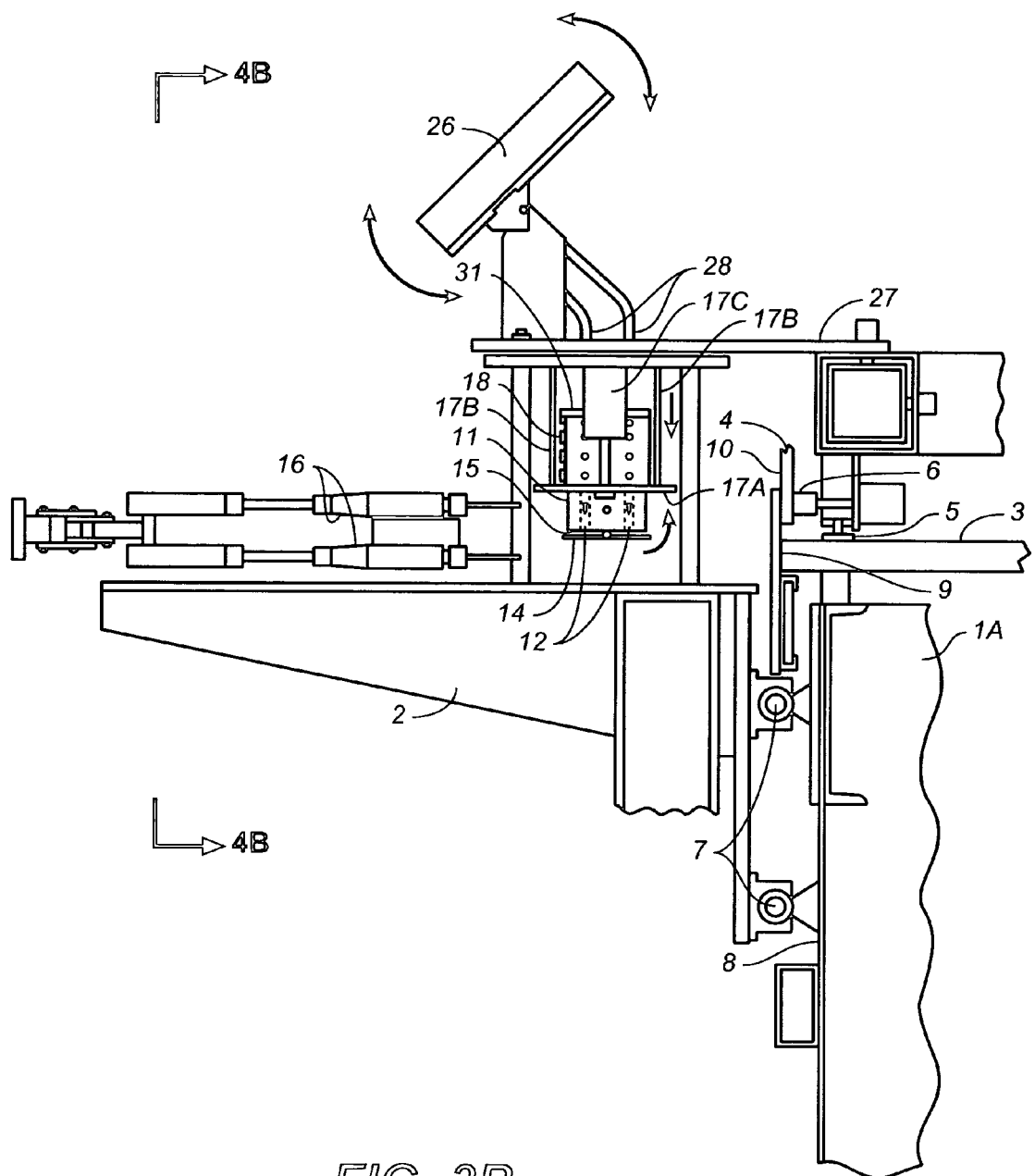
FIG. 3B is the same fragmentary side view of the workstation of FIG. 3A but showing the carriage moved to an application site along workstation and the screw dispenser lowered to deliver screws to a hinge and screw applicator positioned to receive the screws.
Figure 3C:
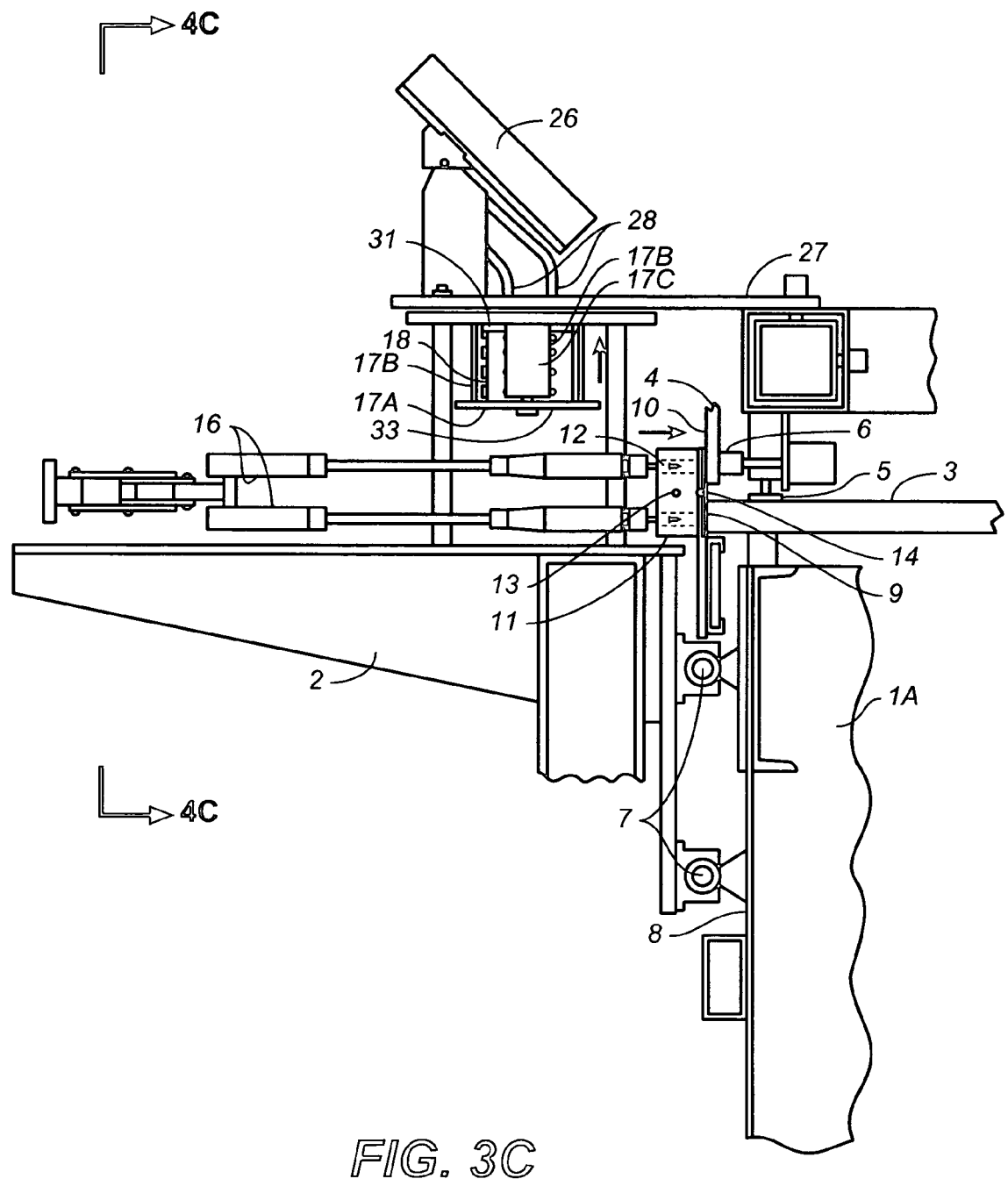
FIG. 3C is the same fragmentary side view of the workstation of FIG. 3A showing the carriage at the application site with the screw dispenser raised to the elevated position after delivery of screw to the hinge and screw applicator and the hinge and screw applicator pivoted sideways to bring the hinge and screws into position to be driven by the screw drivers.

Block 11 is rotatable about an axle 13 between a horizontal position, as seen in FIGS. 3A and B, with passages 12 vertical for receiving screws from above and a vertical position, as shown in FIG. 3C, with passages 12 horizontal for driving screws through passages 12. Block 11 moves laterally between a screw receiving position, as shown in FIGS. 3A and B, and a hinge and screw applying position against the door edge 9 and jamb face 10 held in place on the workstation, as shown in FIG. 3C. At the hinge and screw applying position block 11 holds the opened hinge 14 against door edge 9 and jamb face 10 while screws are being driven from the other thereof through block 11 and the hinge leaves into the door and jamb.

The screw receiving passages 12 of block 11 are spaced and located to conform to the pattern and spacing of the screw holes of the hinge when the hinge is held against the surface of block 11 with the hinge opened with a leaf to either side of the hinge joint. The standard hinge used for hanging doors has three screw holes in each hinge leaf spaced across the leaf in the hinge joint direction. The outer screw holes of each leaf are aligned in the hinge joint direction and the middle screw hole is offset outwardly of the hinge joint from the outer screw holes. With the hinge open each pair of counterpart screw holes in the leaves are aligned in the direction normal to the hinge joint. In this embodiment the screw receiving passages are spaced and located to conform to and register with the described screw hole pattern and alignment of a standard hinge, with the hinge open and the hinge joint aligned with axle 13 of block 11.

Magnets (not shown) are provided at the bottom 15 of block 11 for receiving and holding an opened hinge 14 thereagainst, as seen in FIG. 3B. The hinge may be applied manually against the bottom of the block. However, as described in full in Patent '290, the carriage may be provided with a magazine of opened hinges (not shown here) which is adapted to feed an individual hinges to the bottom 15 of block 11 for each hinge installation.

Screwdrivers 16 are mounted on the carriage for movement from a retracted position, as shown in FIGS. 3A and B to an engaged position, as shown in FIG. 3C, where their bits move into the passages in block 11 to drive the screw through the hinge into the door edge and jamb face.

Dispenser 18 rests on platform 17A that is mounted on carriage 2 by piston 17C and by guide rods 171B that are slidably engaged by platform 17A. Platform 17A together with dispenser 18 is vertically movable by actuating piston 17C between a higher screw receiving position and a lower screw dispensing position. Dispenser 18 immediately above the position of block 11 so that dispenser 18 may lowered to a position immediately adjacent block 11 when block 11 is at the horizontal position for receiving screws.

Figure 5:
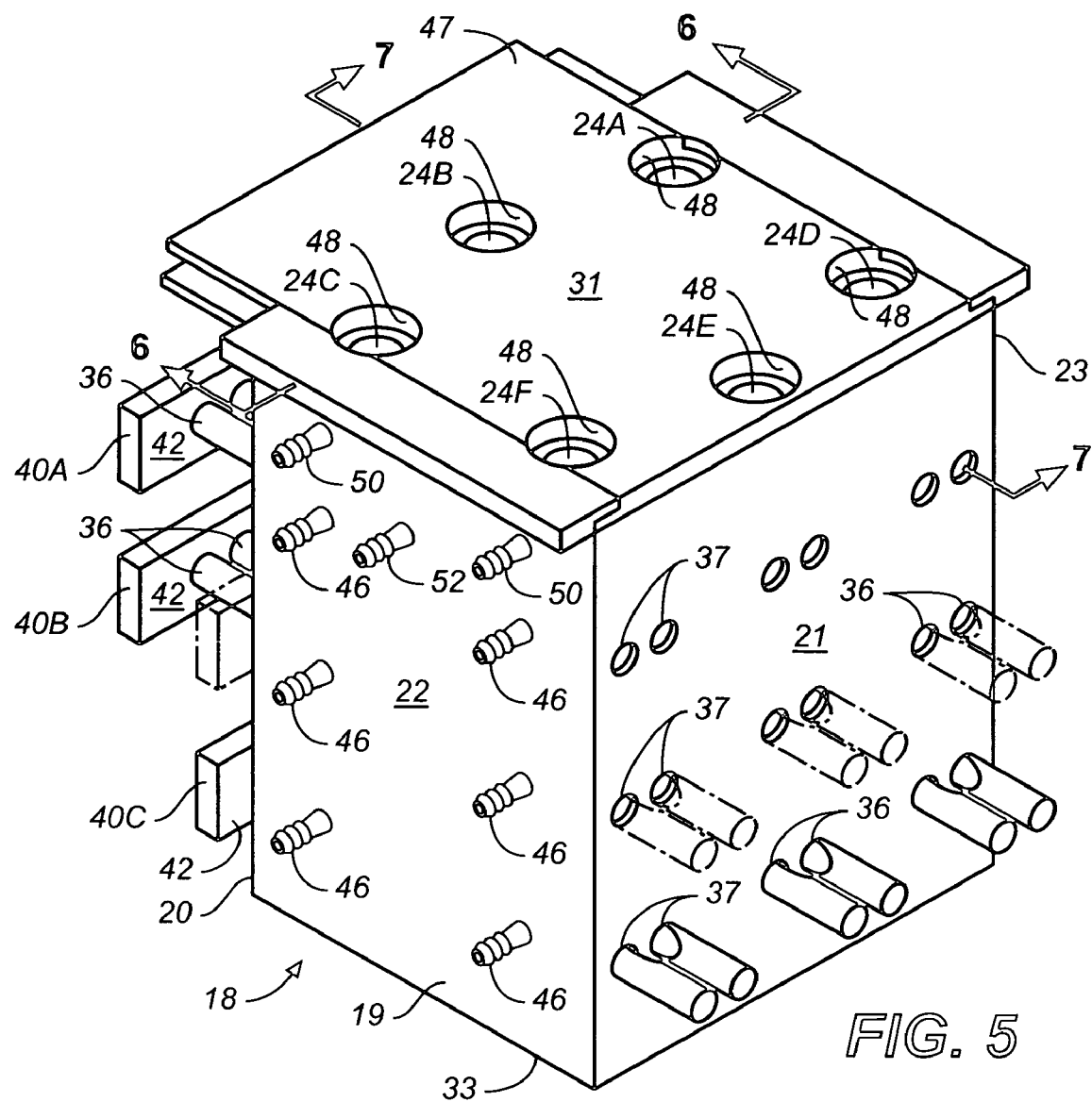
FIG. 5 is an isometric, enlarged view, in isolation, of the dispenser depicted in the workstation of FIG. 3A showing the dispenser slide cover at the open position with the openings therein in register with the screw passageway, the lower level gate engaged, the upper level gate disengaged and the midlevel gate in solid lines in the disengaged mode and in dotted lines in engaged mode.
Figure 6:
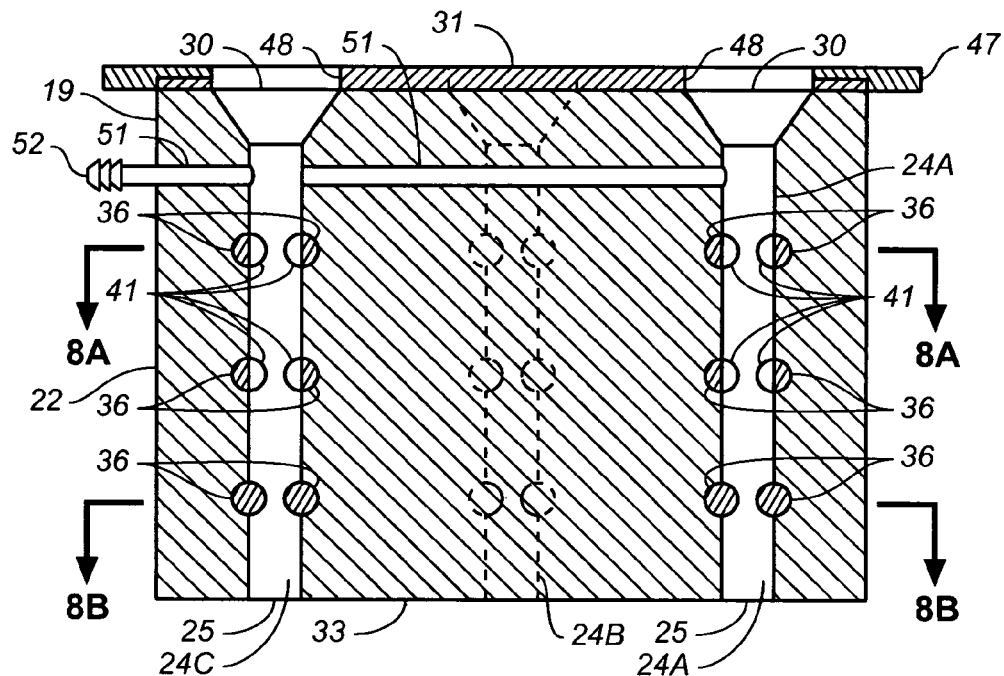
FIG. 6 is a fragmentary sectional view of the dispenser of FIG. 5 taken along lines 6A-6A in FIG. 5 showing details of screw passageways and the gate rods at the passageways.
Figure 7:
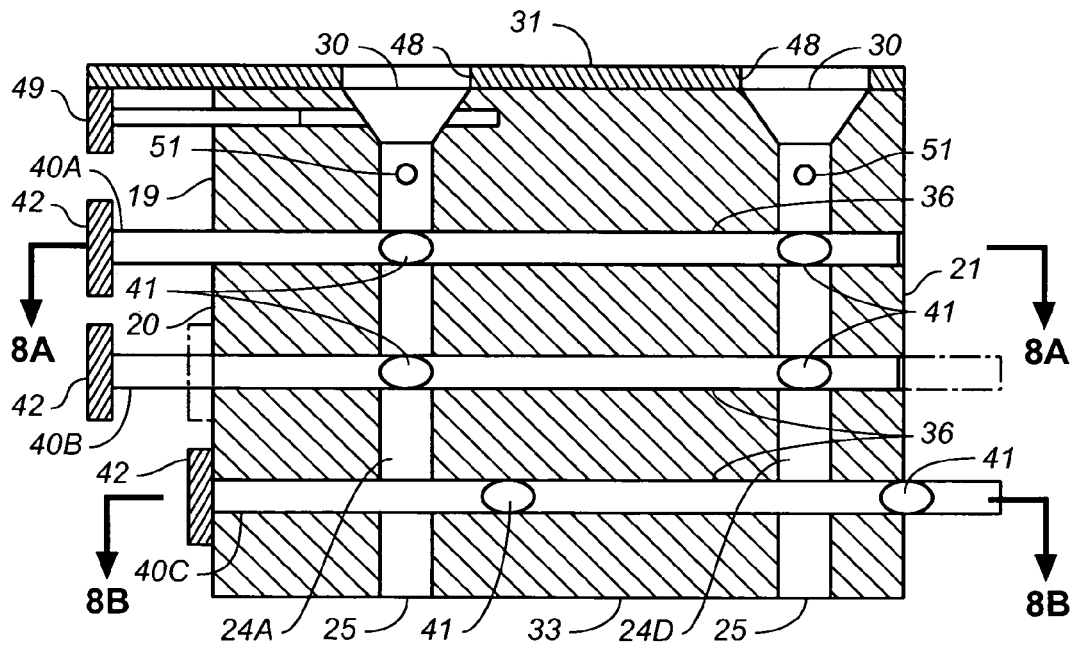
FIG. 7 is a is fragmentary sectional view of the dispenser of FIG. 5 taken along lines 7A-7A in FIG. 5 showing details of screw passageways and the gate rods at the passageways.

As best seen in FIGS. 5-7 dispenser 18 comprises a block 19 having opposed sidewalls 20 and 21 that are aligned with axle 13 of block 11 and opposed sidewalls 22 and 23 that are perpendicular to axle 13.

Dispenser block 19 has vertical screw dispensing passageways 24A, 24B and 24C toward sidewall 22 of block 19 and passageways 24D, 24E and 24F toward sidewall 21. The dispenser passageways end in respective openings 25 at the bottom of dispenser block 19 that are spaced apart in a pattern that matches the openings of passages 12 in screw and hinge block 11. When the dispenser 18 is at its screw dispensing position and block 11 is at its screw receiving position, each dispenser passageway bottom opening 25 registers with a respective screw receiving passage 12 in block 11 to be in flow communication therewith.

Figure 4A:
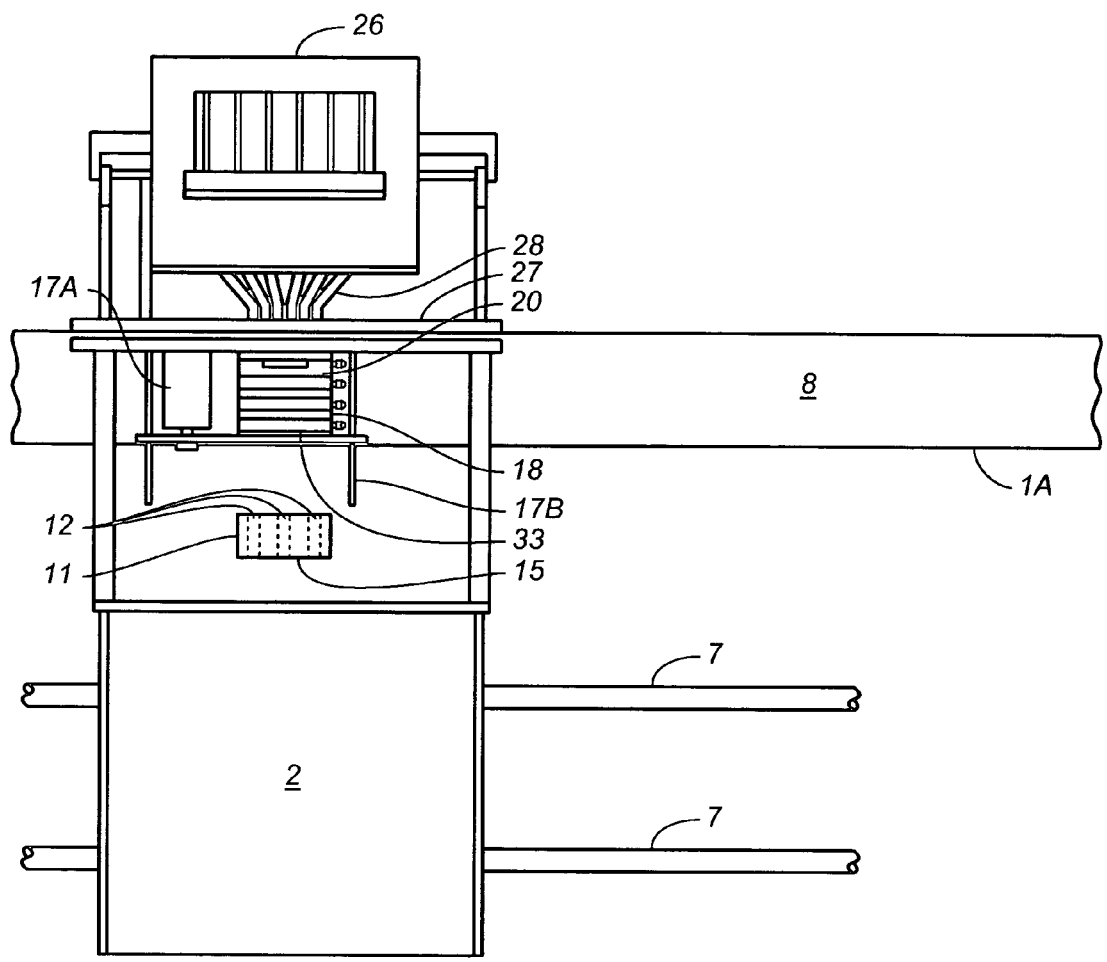
FIG. 4A is a fragmentary sectional view at the front side of the workstation of FIG. 3A taken along lines 4A-4A of FIG. 3A showing the carriage located at the home position and the dispenser elevated to receive screws from the screw dispenser.

Looking now particularly at FIG. 4A, carriage 2 is shown at a home position which is near one end of the traverse of carriage 2 along the front side 8 of workstation 1. This is the home position shown schematically in FIG. 1. Screw feeder 26 is mounted at the home position on support 27, which, in turn, is mounted on workstation frame 1A. Screw feeder 26 delivers screws individually through tubes 28 descending therefrom. Each tube 28 descends to a respective hole through support 27 so that screws may be delivered through support 27 to dispenser 18 when the dispenser 18 is stationed immediately below support 27. As seen in FIG. 4A, when carriage 2 is at the home position with dispenser raised to the screw receiving position, the top of dispenser 18 is immediately adjacent the lower side of support 27. The holes for tubes 28 in support 27 are located and spaced so that each registers with a respective top opening 30 of a respective passageway of passageways 24A-24F of dispenser 18 so there is flow communication to all of the passageways 24A-24F for screws delivered from screw feeder 26 through tubes 28 when carriage 2 is at the home position.

Figure 4B:
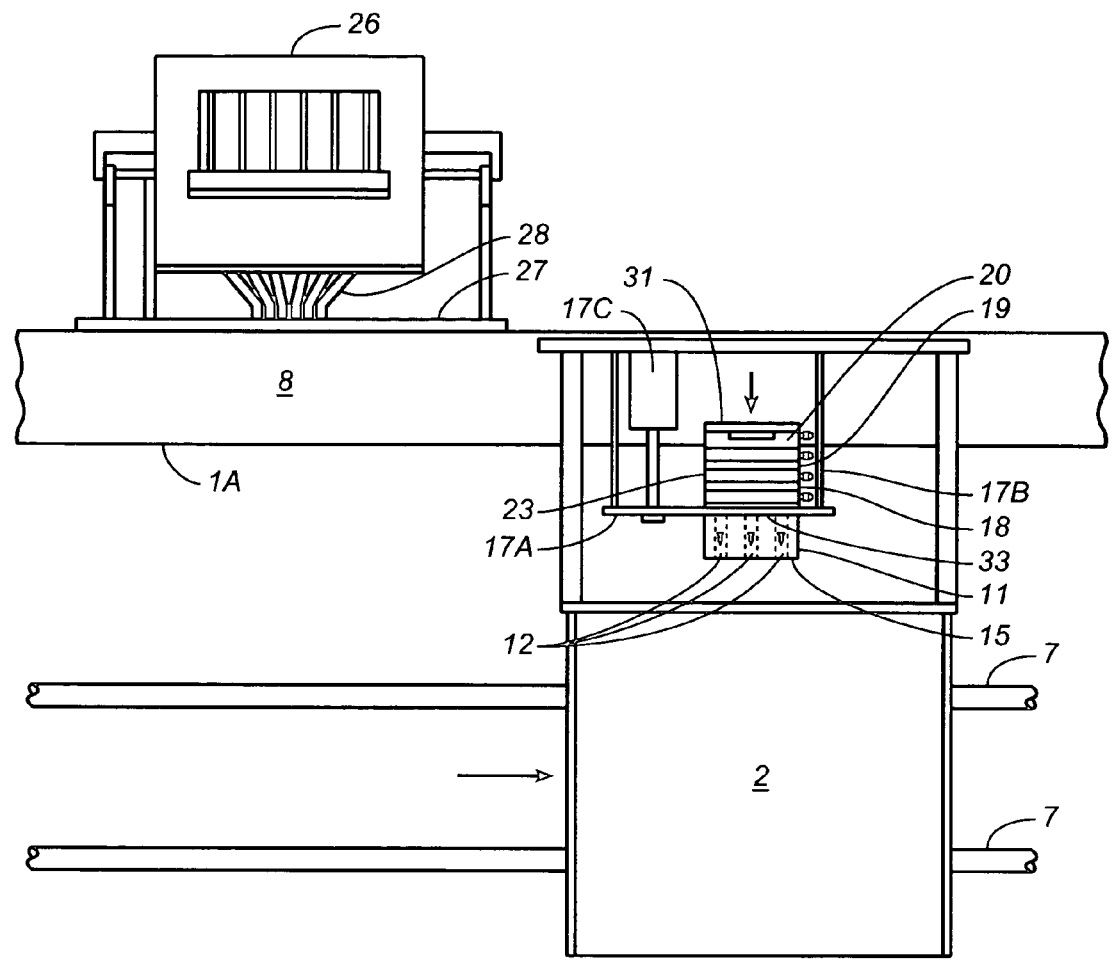
FIG. 4B is a fragmentary sectional view at the front side of the workstation of FIG. 3B taken along lines 4B-4B of FIG. 3B showing the carriage moved to an application site along workstation and the screw dispenser lowered to deliver screws to a hinge and screw applicator positioned to receive the screws.
Figure 4C:
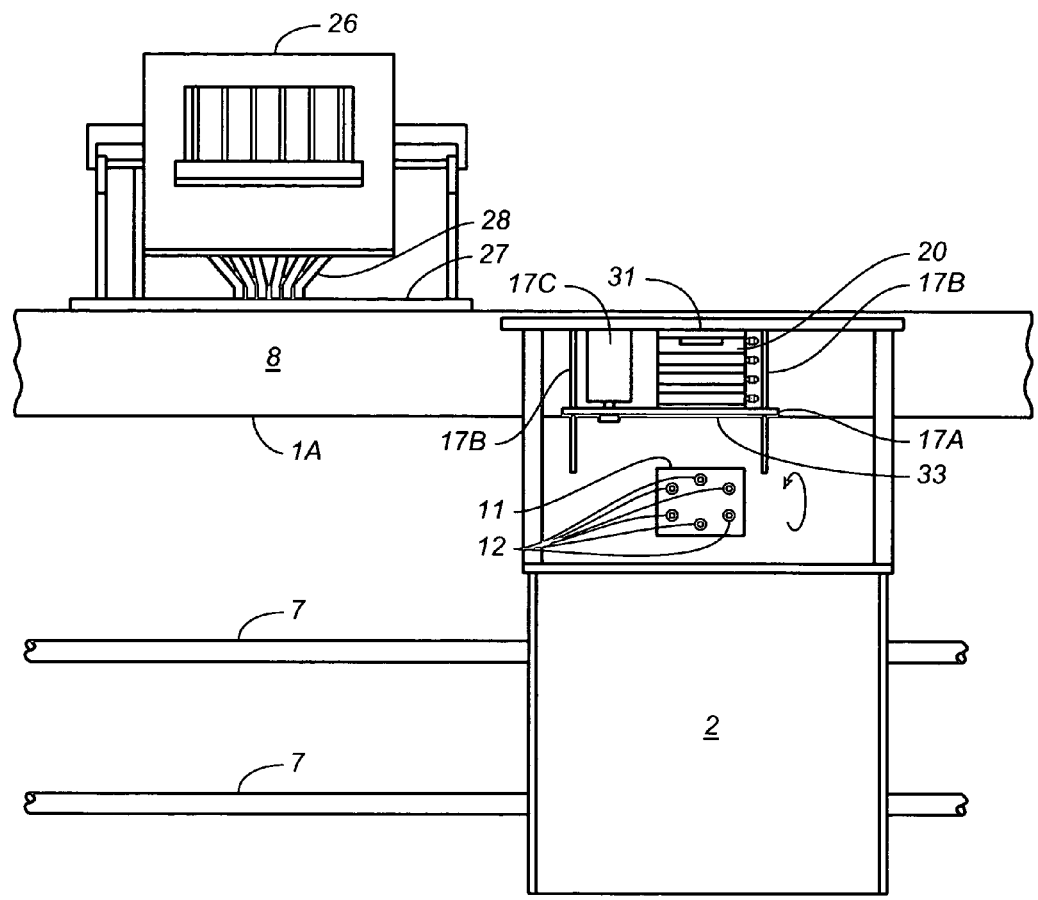
FIG. 4C is a fragmentary sectional view at the front side of the workstation of FIG. 3C taken along lines 4C-4C of FIG. 3C showing the carriage at the application site with the screw hinge dispenser raised to the elevated position after delivery of screw to the hinge and screw applicator and the hinge and screw applicator pivoted sideways to bring the hinge and screws into position to be driven by the screw drivers.

After dispenser 18 is loaded with screws at the base position carriage 2 is moved along the adjacent door edge and jamb face to the A (first) hinge position as shown in FIG. 4B. Dispenser 18 is dropped to the screw dispensing position which brings the bottom of dispenser 18 adjacent hinge and screw receiving block 11, which is in the horizontal position, with the passageways of dispenser 18 in flow communication with the screw receiving passages of block 11. Dispenser 18 is then activated, as will be explained, to drop a charge of screws into block 11, one screw into each passage. An open hinge is attached at the bottom of block 11. Following this, dispenser 18 is raised again the screw receiving position to provide clearance for rotating block 11 to the vertical position, as shown in FIG. 4C. Block 11 is then moved to the hinge and screw applying position and the screwdrivers 16 are advanced and activated to drive the screws through the hinge into the door edge and jamb face. The screwdrivers 16 are then retracted and the carriage 2 moved on to the second hinge position. At the same time block 11 is rotated to the horizontal position. Then dispenser 18 lowered to the screw dispensing position against block 11 and another charge of screws dropped into passages 12. The same hinge application steps are carried out at this B (second) position as just described. In this fashion hinges are applied at all of the hinge positions. After completion of the application of the last hinge, carriage 2 is moved back the home position for recharging with screws to begin the next cycle.

Desirably, the screw feeder employed is capable of serially dispensing groups of screws, the screws in each group being dispensed at or about the same time. Various types of feeders are available for this purpose. The preferred feeders are those described in my U.S. Pat. No. 5,425,473 and my U.S. patent application Ser. No. 10/681,484, filed Oct. 8, 2003. Those feeders have an oscillating chamber in which screws are collated and then fed in rows to an escapement that serially dispenses groups of screws, each screw being dropped into a separate tube.

Referring now to FIGS. 5 through 13B, block 19 of dispenser 18 has passageways 24A through 24F therethrough extending from openings 30 at top 31 to openings 25 at bottom 33. Passageways 24A-24F are arranged to conform to the pattern and spacing of passages 12 of block 11. Consequently, passageways 24A and 24D are adjacent to sidewall 23 and are aligned in the direction parallel to sidewalls 22 and 23. Passageways 24C and 24F are adjacent to sidewall 22 and are aligned in the direction parallel to sidewalls 22 and 23. The remaining pair, passageways 24C and 24D is located midway between sidewalls 23 and also aligned in the direction parallel with sidewalls 22 and 23.

Control rods 36 are slidably engaged through bores 37 in dispenser block 19 at three different levels, between the top 31 and the bottom 33 of block 19 to form stop assemblies or gates 40A, 40B, and 40C. Rods 36 all extend between sidewalls 22 and 23 in parallel with each other and with sidewalls 22 and 23. Control rods 36 at each of the three gates are disposed as follows. A pair of the rods 36 extend along the opposed sides of both of the passageways of each of the three aligned pairs of passageways, i.e. the passageway pair 24A and 24D, the passageway pair 24B and 24E and the passageway pair 24C and 24F.

At each passageway pair one rod 36 of the pair being adjacent to and partially intersecting at one side of each of the respective two passageways and the other rod of the pair being adjacent to and partially intersecting the other side of the respective two passageways. Desirably the axis of each rod is tangential to the respective adjacent passageways so that each rod intersects the respective passageway sides up to a half the width of rod. With this particular design for use with screws or other headed fasteners, there is a clearance between the rod pairs so that the body of the screw may drop between them but the wider head of the screw will be retained against the upper side of the rods. Thus the screw will be held at the control rod pair as illustrated at FIGS. 10B and 11B.

Each control rod 36 is provided with two semicircular cutouts 41 spaced apart along the rod at a distance equal to the distance between the intersecting positions of the rod with the adjacent pair of passageways. Rod cutouts 41 are each desirably configured so that, when the cutouts on the rods are located at the intersecting positions with the adjacent passageways, they conform to the circular walls of such passageways. In this mode the passageways are completely open and unblocked, as seen for example in FIGS. 10A and 11A.

As seen particularly in FIGS. 6 and 7, each of gates 40A, 40B, and 40C further comprises a brace 42 outside of sidewall 22 secured to the sidewall 22 end of all control rods 36 of the respective gate. Thus, in the case of each gate, all of the rods of that gate may slide along their bores 37 as a unit between a stop or dosed position and an open position. Cutouts 41 at the rods of each gate are positioned so that, when brace 42 of that gate is moved to slide all rods 36 of that gate to an open position, all of the cutouts 41 on the rods are brought to the intersecting positions with the adjacent pair of passageways. This is shown for the top gate 40A and the middle gate 40B in FIGS. 6 and 7. When a brace 37 is moved to the stop position, where cutouts 41 are no longer at the intersecting positions, rods 36 of that gate protrude into the adjacent passageways to effectively block passage of a screw or other article through that level of the passageways. This is shown for the bottom gate 40C in FIGS. 6 and 7.

Figure 8A:
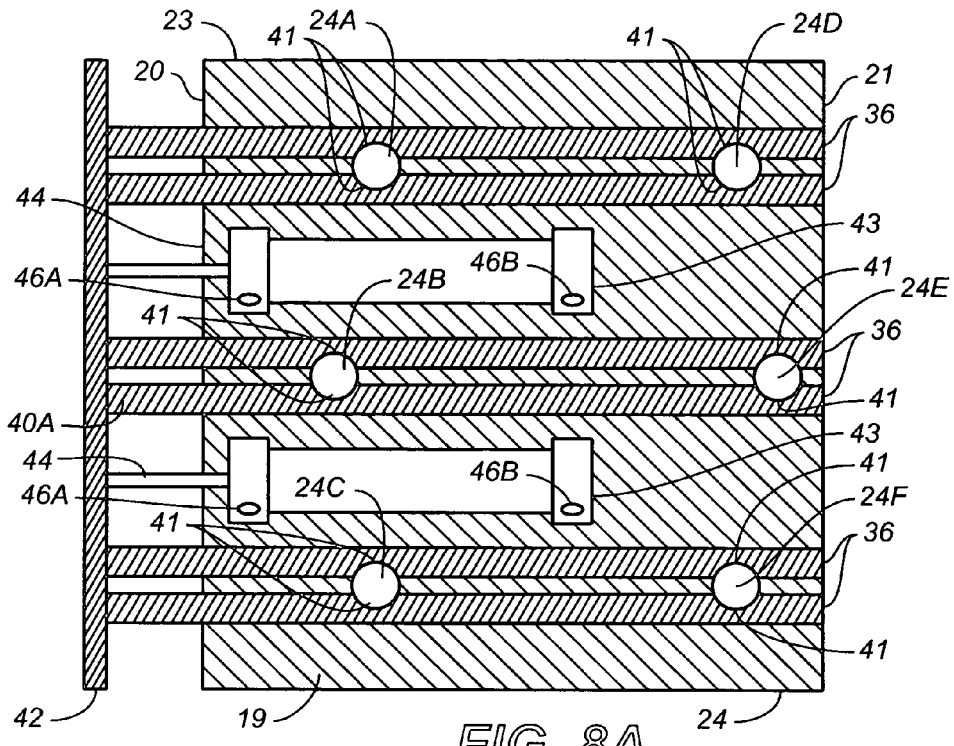
FIG. 8A is a fragmentary sectional view of the dispenser of FIG. 5 taken along lines 8A-8A in FIGS. 6 and 7 showing the gate rods at the upper level in the engaged position.
Figure 8B:
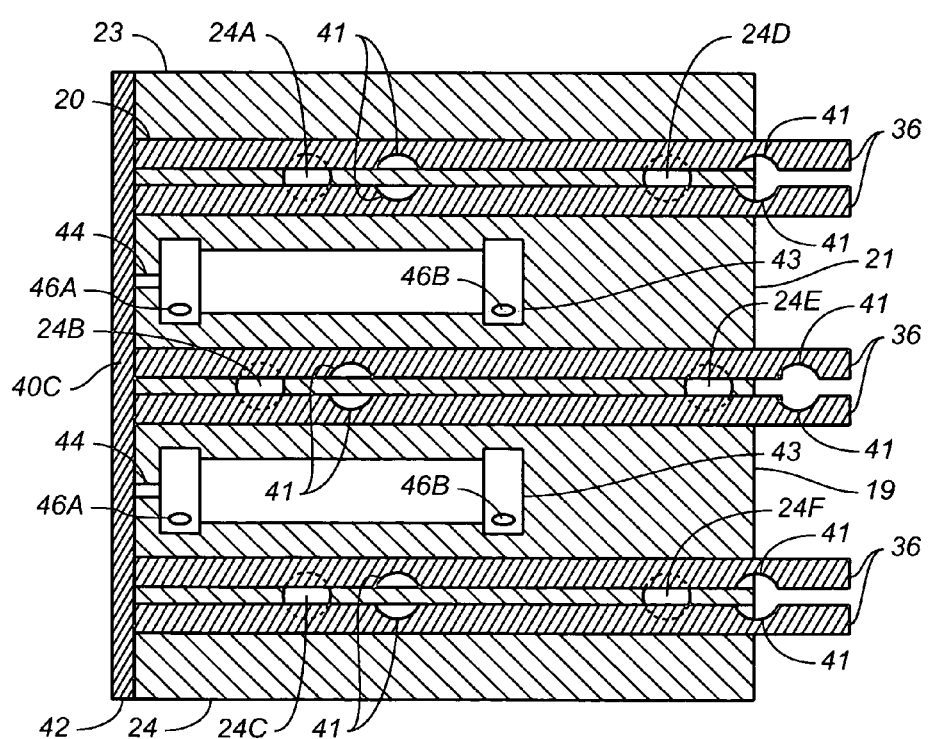
FIG. 8B is a fragmentary sectional view of the dispenser of FIG. 5 taken along lines 8B-8B in FIGS. 6 and 7 showing the gate rods at the lower level in the disengaged position.

The gate at each level is provided with a pair of operator pistons for moving that gate between the open and stop positions. In FIG. 8A and with respect to gates 40A and 40C, piston rods 44 of each pair of double-acting pistons 43 are fixed to the brace 42 at each gate. Air pressure may be introduced at one end of each piston 43 at one end through duct 46A and at the other end through duct 4613. When air pressure is introduced into the pair of pistons 43 through ducts 46A, each gate is moved to the stop position, as shown in FIG. 81B for gate 401B When air pressure is introduced into the pair of pistons 43 through ducts 461B, each gate is moved to the open position, as shown in FIG. 8A for gate 40A. To move the gate back to the open position the air pressure is relieved from pistons 43. Air ducts in block 19 (not shown) connect pistons 43 to nipples 46 at the exterior, each of which receives a hose from an external air source (not shown).

At top 31 is a slide plate 47 having openings 48 therethrough that in the open mode, as shown in FIGS. 5 to 9D and 12, register with openings 30 and which, as shown in FIGS. 9F to 11, may be slid out of register with and dose off openings 30 at the top 31 of dispenser 18. As seen in FIGS. 11A through 11E, slide plate 47 has a brace 49 outside of sidewall 22 to which is attached a pair of piston rods each of which is attached to an adjacent piston (not shown) constructed and operated like pistons 43 for moving slide plate 47 between an open and dosed positions. Air ducts (not shown) in block 19 connect the sliding plate pistons to nipples 50 at the exterior each of which receives a hose from an external air source (not shown).

As seen best in FIG. 6, an air duct 51 connects between passageways 24A and 24C and therefrom externally to nipple 52. Duct 51 also connects to passageways 24B and 2D-24F through side channels (not shown).

Nipple 52 also receives a hose from an external air source (not shown) for applying air pressure to duct 51. Air duct 51 supplies air under pressure to all of passageways 24A-24F above the three gate levels 40A-40C, when slide plate 47 is in the dosed position, to propel screws toward the bottom of dispenser block 19.

Figure 9C:
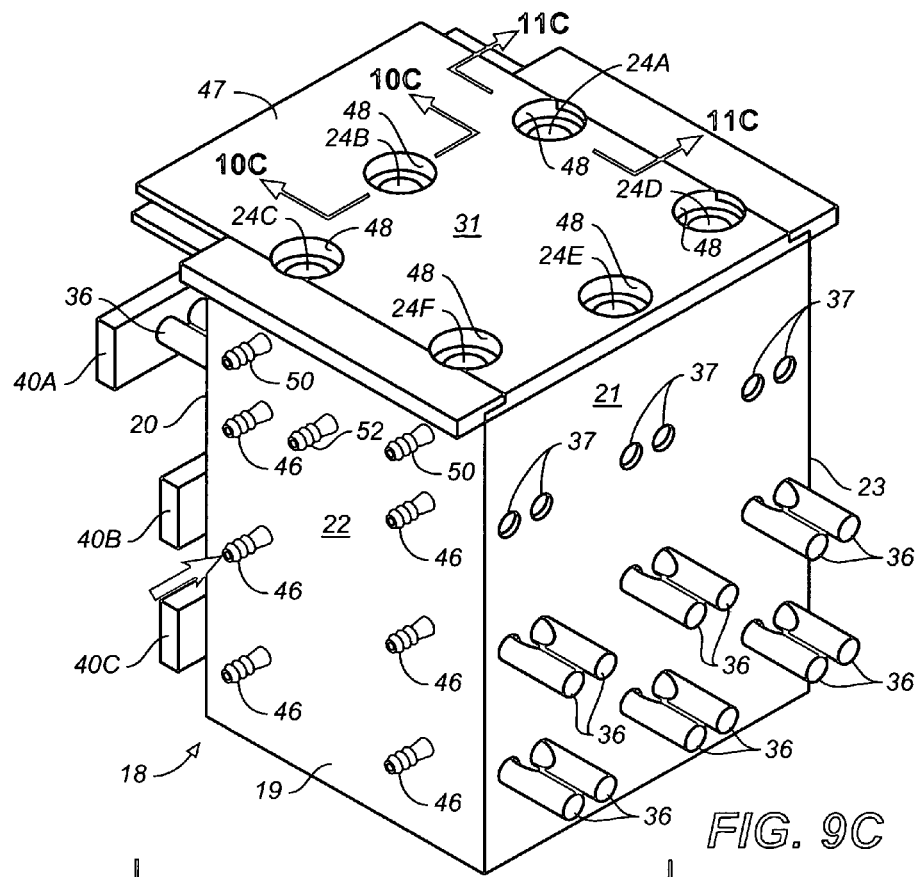
FIG. 9C is the same isometric view of the dispenser as FIG. 5 but showing upper gate in disengaged mode and the midlevel and lower level gate disengaged.
Figures 10C, 11C:
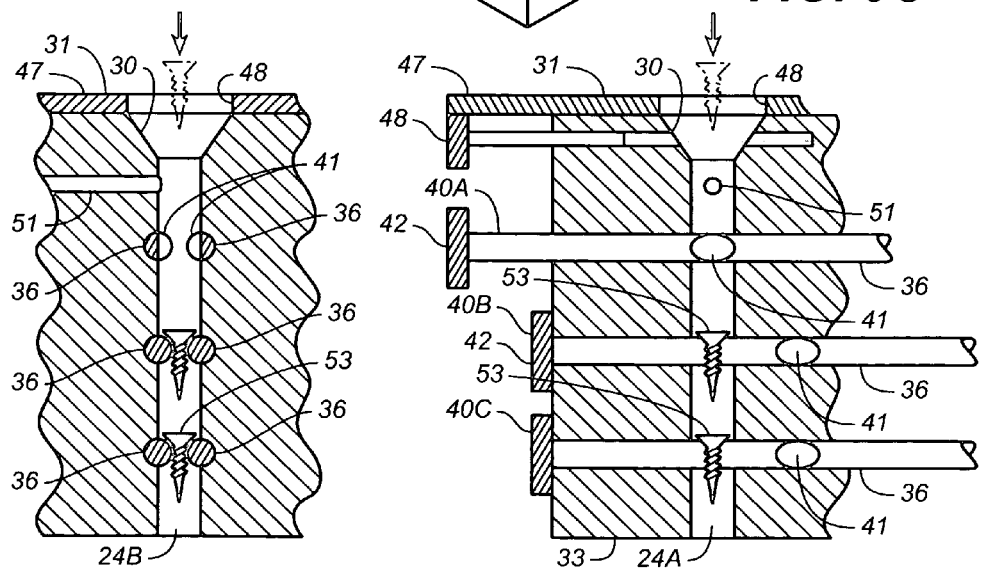
FIG. 10C is a fragmentary sectional view of the dispenser of FIG. 9C taken along lines 10C-10C in FIG. 9C showing details of a screw passageway and the gate rods at the passageway.
FIG. 11C is a fragmentary sectional view of the dispenser of FIG. 9C taken along lines 11C-11C in FIG. 9C, in a direction perpendicular to the view of FIG. 10 C, showing details of a screw passageway and the gate rods at the passageway.
Figure 9F:
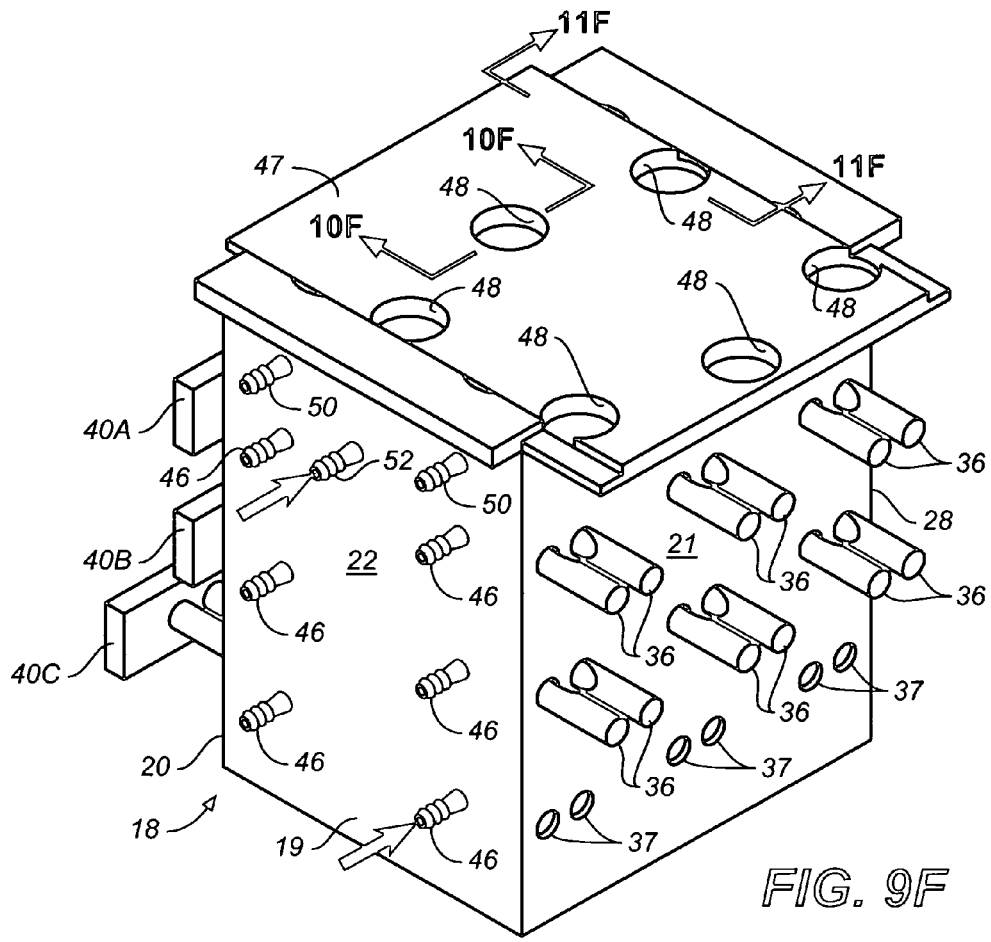
FIG. 9F is the same isometric view of the dispenser as FIG. 9E but with the lower level gate rods moved to the disengaged position.
Figure 10F:
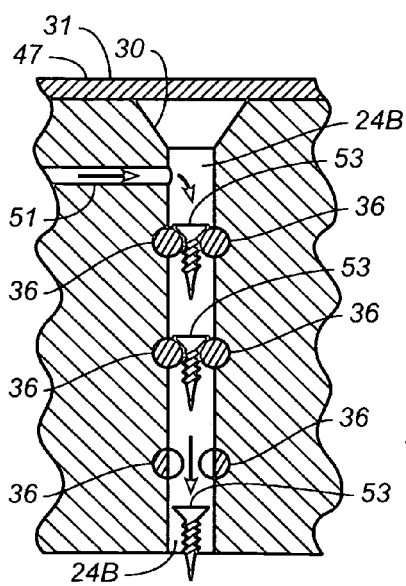
FIG. 10F is a fragmentary sectional view of the dispenser of FIG. 9F taken along lines 10F-10F in FIG. 9F showing details of a screw passageway and the gate rods at the passageway.
Figure 11F:
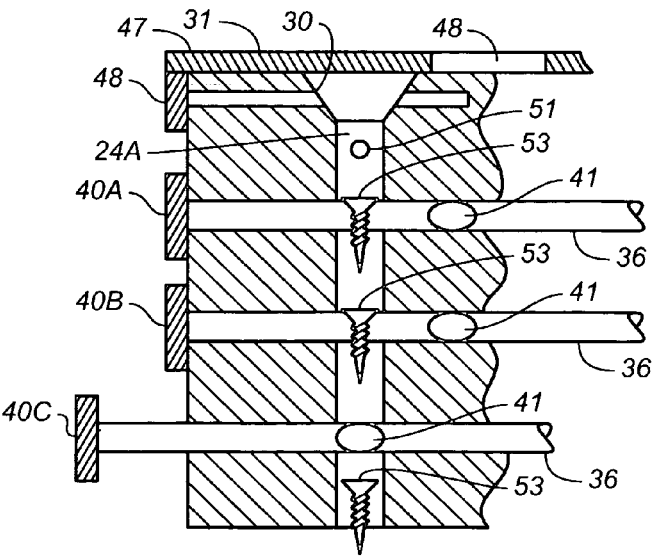
FIG. 11F is a fragmentary sectional view of the dispenser of FIG. 9F taken along lines 11F-11F in FIG. 9F, in a direction perpendicular to the view of FIG. 10F, showing details of a screw passageway and the gate rods at the passageway.
Figure 9G:
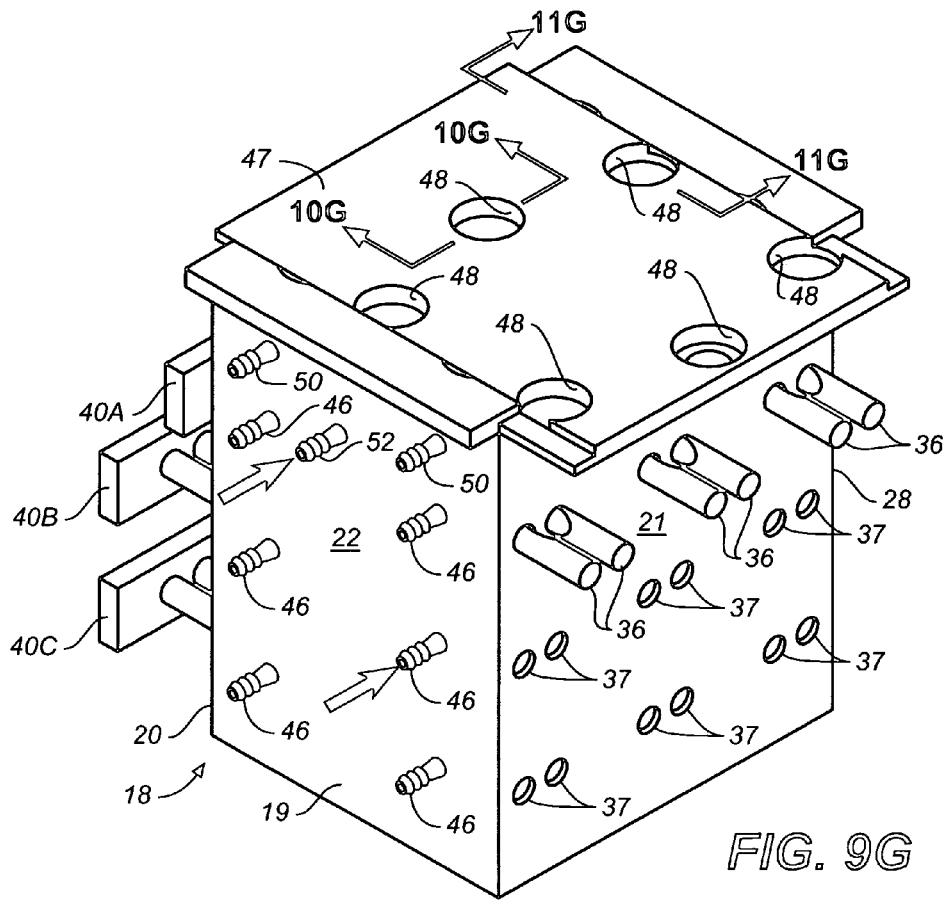
FIG. 9G is the same isometric view of the dispenser as FIG. 9E but with midlevel and lower level gate rods moved to the disengaged position.
Figure 10G:
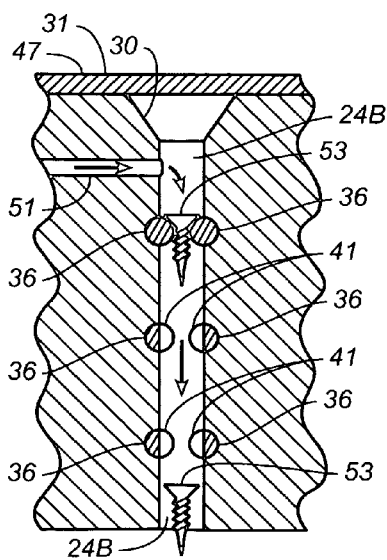
FIG. 10G is a fragmentary sectional view of the dispenser of FIG. 9G taken along lines 10G-10G in FIG. 9G showing details of a screw passageway and the gate rods at the passageway.
Figure 11G:
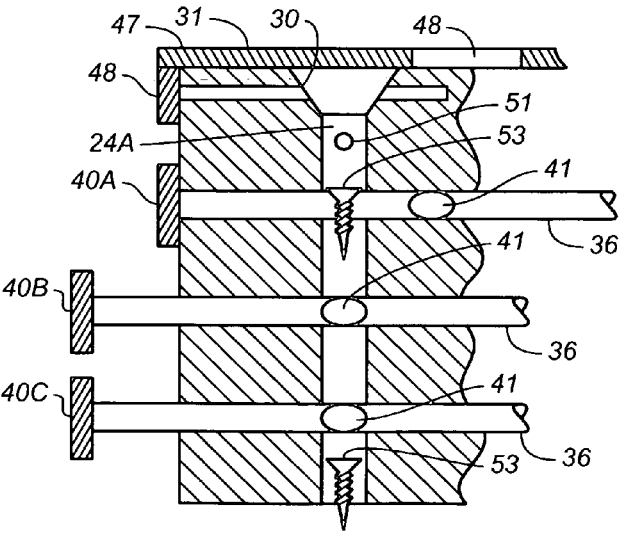
FIG. 11G is a fragmentary sectional view of the dispenser of FIG. 9G taken along lines 11G-11G in FIG. 9G, in a direction perpendicular to the view of FIG. 10G, showing details of a screw passageway and the gate rods at the passageway.
Figure 9H:
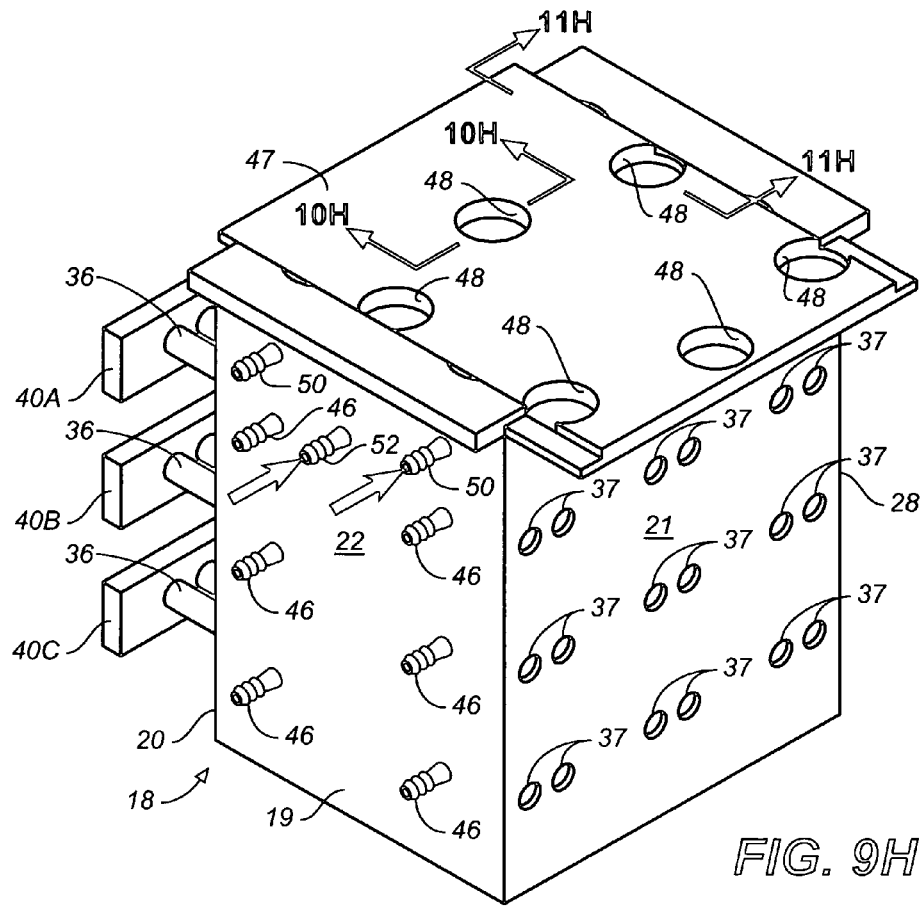
FIG. 9H is the same isometric view of the dispenser as FIG. 9E but with gate rods at all levels moved to the disengaged position.
Figure 10H:
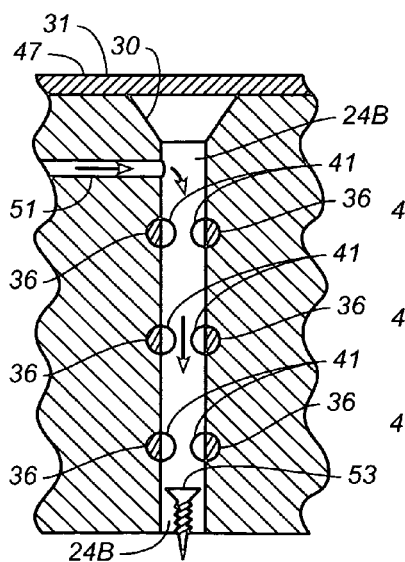
FIG. 10H is a fragmentary sectional view of the dispenser of FIG. 9H taken along lines 10H-10H in FIG. 9H showing details of a screw passageway and the gate rods at the passageway.
Figure 11H:
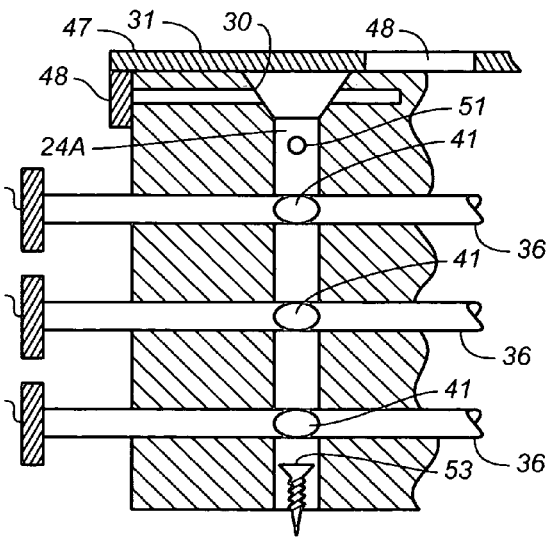
FIG. 11H is a fragmentary sectional view of the dispenser of FIG. 9H taken along lines 11H-11H in FIG. 9H, in a direction perpendicular to the view of FIG. 10H, showing details of a screw passageway and the gate rods at the passageway.

Operation of dispenser 18 may be described with reference to FIG. 9A through FIG. 12. At the start, as seen in FIGS. 9A, 10A and 11A dispenser 19 is completely empty of screws and slide plate 47 is in the open position ready to receive screws. To start the screw charging procedure gate 40C is first moved to the stop position by actuation of pistons 43 for stop assembly 40C. Then screws 53 are fed as a group into openings 30 at the top of passageways 24A through 24F, one screw into each opening. The screws fall down passageways 24A-24F, moving past the top and middle gates, which are open, and then are held at the lowest gate level 40C, by gate 40C as shown in FIGS. 9B, 10B and 11B. Next, gate 40B is moved to the dosed position and a second charge of screws 53 fed into openings 30, one screw into each passageway. These screws fall to gate level 40B where gate 40B retains them, as seen in FIGS. 9C, 10C and 11C.

Following this, gate 40A is moved to the closed position and a second charge of screws fed into openings 30, one screw into each passageway. These screws fall to gate level 40A where gate 40A retains them, as seen in FIGS. 9D, 10D and 11D.

At this point dispenser 18 is fully charged and ready for dispensing screws in groups, each screw in the group to a separate particularized and localized position at one or more dispensing sites. In the particular example of a hinging operation as shown in FIGS. 2 through 4C, dispenser 18 in each instance is brought to the same dispensing site, i.e., where its passageways 24A-24F may communicate with the passages 12 of screw and hinge block 11. Both dispenser 18 and screw and hinge block 11, as well as the other equipment on carriage 2 move together between hinging positions A, B and C, at each of which screws are dispensed.

In this example dispenser 18, now charged, is brought with carriage 2 to position A of FIG. 2. Dispenser 18 is then lowered to bring passageways 24A-24F into communication with passages 12 of screw and hinge block 11 which is then in the horizontal screw receiving position. The pistons operating slide are actuated to move slide plate to the dosed position. Air pressure is introduced though air ducts 51 into passageways 24A-24F. Gate 40C is moved to the open position to discharge under air pressure the screws that were held at gate 40C out of all of passageways 24A-24F and into respective passages 12 of screw and hinge block 11. Dispenser block 19 is lifted and the hinge application completed at Position A.

Carriage 2 is then moved to Position B and dispenser 18 again lowered to the screw dispensing position. Air pressure is again introduced into ducts 51 gate 40B is then moved to the open position to release to the screws at gate 40B and into passageways 24A-24F of block 19. Following completion of hinge application at Position B, carriage 2 is moved to Position C where the same procedure is carried out as at Position B except that at Position C gate 40A is opened to discharge to block 11 the screws retained at gate 40A.

After completion of hinging at Position C, the carriage with the empty dispenser 18 is moved back to Home Position. Dispenser 18 is raised to the screw receiving position and slide plate is opened to receive another load of screws. The dispenser is thus prepared to complete additional cycles as described.

Figure 12:
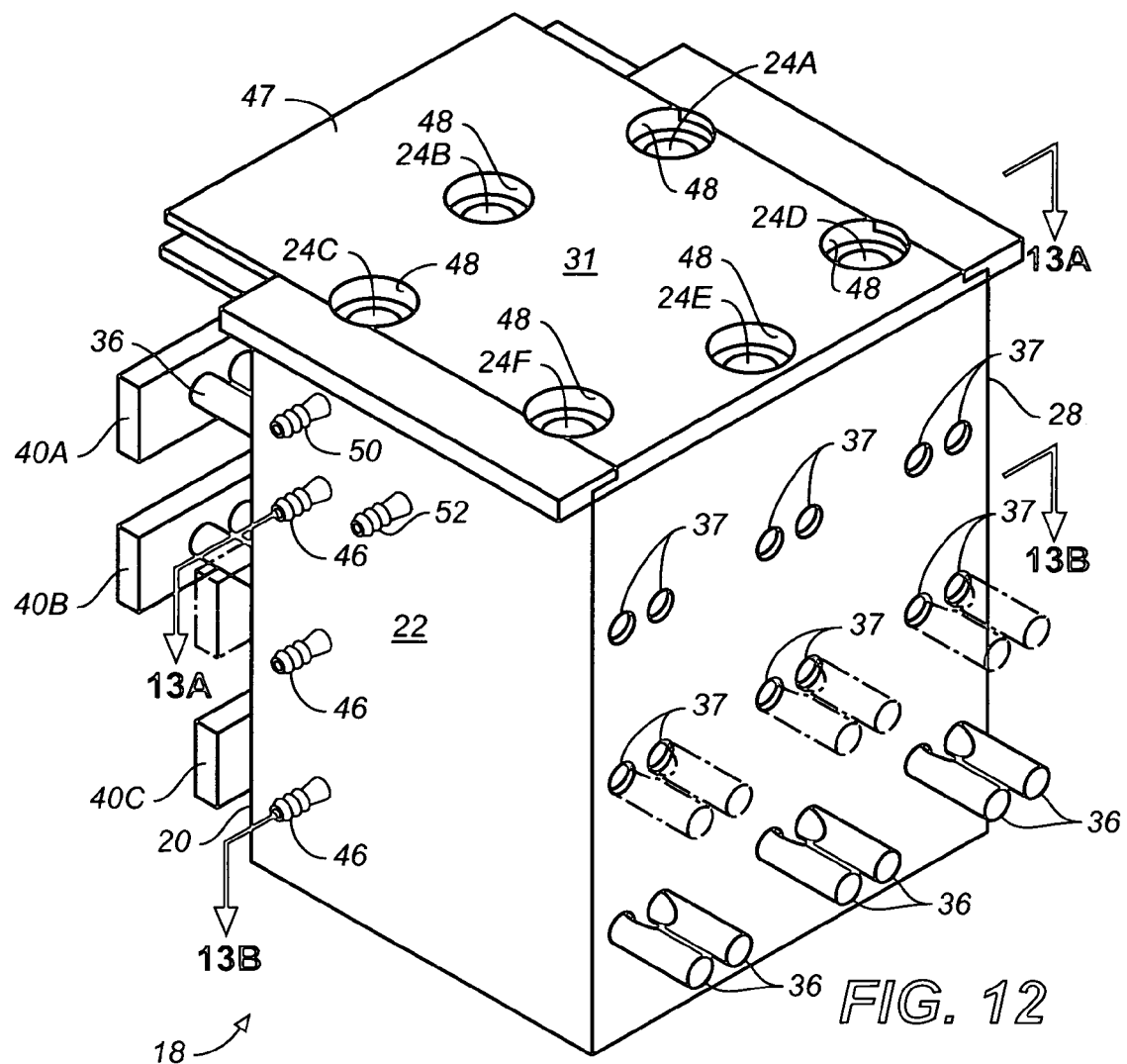
FIG. 12 is an isometric view a another embodiment of the dispenser that corresponds to the embodiment of FIG. 5-11H, except for a different configuration of the piston operators for the passageway gates and the slide cover and the air ducts therefor, showing the dispenser slide cover at the open position with the openings therein in register with the screw passageway, the rods of the lower most gate in the engaged position, the rods of the upper most gate in the disengaged position and the rods of the intermediate gate solid lines in the disengaged position and in dotted lines in the engaged position.
Figure 13A:
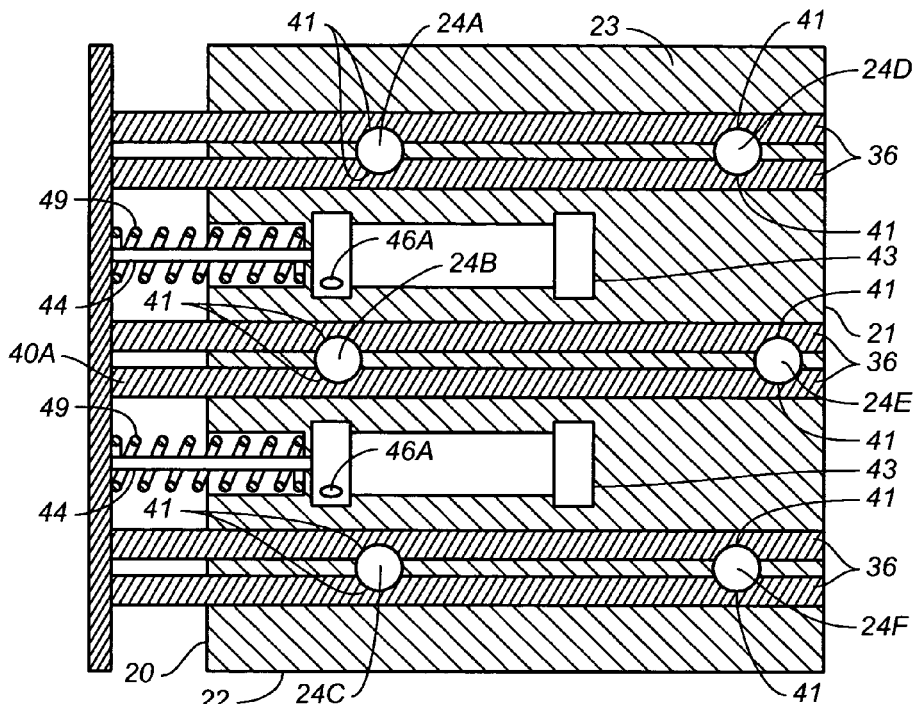
FIG. 13A is a fragmentary sectional view of the dispenser of FIG. 12 taken along lines 113A in FIG. 12 showing gate rods at the lower level at the disengaged position and the pair of air cylinder actuators for the gate rods in the extended position.
Figure 13B:
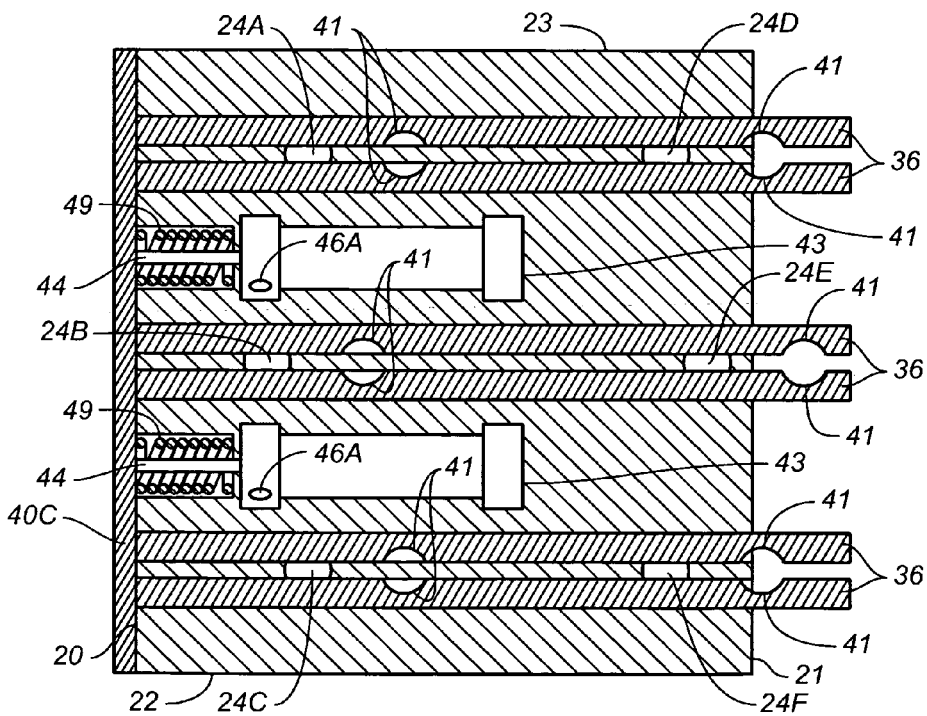
FIG. 13B is the same fragmentary sectional view as in FIG. 13A but with lower level gate rods at the engaged position and the cylinder actuators therefor in the retracted position.

In the embodiment of FIGS. 12, 13A and B is shown a different an alternative operator piston arrangement for the operator pistons for gates 40A-40C and slide plate 47. In this embodiment, the pistons are singe-acting and as shown for FIGS. 13A and C, piston rods 44 of each pair of pistons 43 are fixed to the brace 42 at each gate and a spring 49 surrounding each rod 44 acts against brace 42 to bias gate 40A to the open position as shown in FIG. 13A. When air pressure is introduced into the pair of pistons 43 at ducts 46A, each gate is moved to the stop position, as shown in FIG. 13B for gate 40C. To move the gate back to the open position the air pressure is relieved from pistons 43. Ducts 46A connect to nipples 46 for supplying compressed air.

It will be apparent to those skilled in the art that in the dispenser various other mechanical or magnetic expedients in place of control rods 36 as stops or gates to selectively open and close off the passageways at the various levels of the dispenser. Also, the outlets of the passageways may each be fitted with tubes or other means to channel each exiting screw or other article to a particular desired location for an intended use.

In another embodiment for door hinging apparatus, a hinge and screw applicator appliance, such as hinge and screw block 11 of the forgoing embodiment, may be stationed permanently at each worksite in the place of a single shuttle mounted applicator. In this embodiment each block 11 is mounted at its worksite, such as at each of Positions A, B and C, to move between a horizontal screw receiving position and a vertical screw and hinge applying position as described in the preceding embodiment. The dispenser remains on the shuttle and moves on the shuttle to each worksite to a screw dispensing position at which the passageways of the dispenser register with openings 12 of the hinge and screw block 11 at the worksite when the block 11 is in the screw receiving position.

The invention claimed is:

1. Apparatus for applying workpieces to a base at a series of worksites on the base with groups of fasteners which comprises
   a. a dispenser adapted to receive at a charging site a group of fasteners for each of the worksites of the series and serially dispensing a group of fasteners at each worksite to a workpiece applicator adapted to serially receive groups of fasteners from the dispenser;
   b. a fastener feeder at the charging site adapted to selectively feed a series of groups of fasteners to the dispenser when the dispenser is at the charging site; and
   c. means for moving the dispenser between the charging site and the worksites and consecutively between each of the worksites, whereby the dispenser may receive a series of groups of fasteners from the fastener feeder at the charging site, move to and consecutively between the worksites to deposit a group of fasteners at each worksite and then return to the charging site to receive a further series of fastener groups.

2. Apparatus as in claim 1 and further comprising a workpiece applicator at each worksite adapted to apply a workpiece to the base at the respective worksite with a respective group of fasteners.

3. Apparatus as in claim 1 and further comprising a workpiece applicator adapted to apply a respective workpiece to the base at each respective worksite with a respective group of fasteners and means for moving the workpiece applicator consecutively between each of the worksites.

4. Apparatus as in claim 3 and wherein the workpiece applicator comprises an appliance adapted to serially receive groups of fasteners from the dispenser and to consecutively hold each group with the fasteners spaced apart and each fastener in the group at a predetermined location at a respective workpiece to form an application pattern at the respective worksite appropriate for fastening the workpiece against the base.

5. Apparatus as in claim 4 and wherein the dispenser is adapted to dispense each group of fasteners to the dispenser in a pattern conforming to the application pattern and the appliance is adapted to receive fasteners from the dispenser in a pattern conforming to the application pattern.

6. Apparatus as in claim 5 for which the intended base comprises a juxtaposed door edge and a face of a door jamb, the intended workpiece is a hinge with leaves having screw mounting holes, to be applied with the hinge leaves opened with one hinge leaf laid open against the door edge and the other leaf against the jamb face, the application sites are intended to comprise a series of locations along the juxtaposed door edge and jamb face and the intended fasteners are screws and wherein the means for moving the dispenser and workpiece between the charging site and the worksites and consecutively between each of the worksites comprises a shuffle bearing the workpiece and dispenser, the shuffle mounted adjacent the door edge and jamb face location for movement in a path along the door edge and jamb face, and the apparatus further comprises means for holding the door and the jamb with a door edge and a door jamb in juxtaposition.

7. Apparatus as in claim 6 and wherein the application pattern at which the appliance holds the screws at the hinge conform to the respective locations of the hinge screw mounting holes.

8. Apparatus as in claim 7 and wherein the appliance includes means for receiving, holding and applying an open hinge and applying the open hinge against the door edge and jamb face in preparation for driving the screws.

9. Apparatus as in claim 8 and wherein the shuffle additionally bears screwdrivers positioned to drive the screws held by the appliance at the door edge and jamb face through the screw holes and into the door edge and jamb face.

10. Apparatus as in claim 5 for which the intended base comprises a juxtaposed door edge and a face of a door jamb, the intended workpiece is a hinge with leaves having screw mounting holes, to be applied with the hinge leaves opened with one hinge leaf laid open against the door edge and the other leaf against the jamb face, the application sites are intended to comprise a series of locations along the juxtaposed door edge and jamb face and the intended fasteners are screws and wherein the means for moving the dispenser and workpiece between the charging site and the worksites and consecutively between each of the worksites comprises a shuttle bearing the workpiece and dispenser, the shuttle mounted adjacent the door edge and jamb face location for movement in a path along the door edge and jamb face, and the apparatus further comprises means for holding the door and the jamb with a door edge and a door jamb in juxtaposition.

11. Apparatus as in claim 1 and wherein the dispenser is capable of receiving fasteners from a fastener charger at a fastener receiving side thereof and of feeding the fasteners in groups to a discharge side of the dispenser and having a plurality of passages for fasteners extending between the receiving side and the discharge side, a plurality of gates spaced from one another at positions between the receiving side and the discharge side for selectively closing off flow of fasteners along the passages at each gate position and a gate operator for opening and closing each gate, whereby a fastener may be introduced in each passage at the receiving side and, by selective operation of the gates, held at each gate position and selectively released to flow a further distance toward and/or out of the passage at the discharge side of the dispenser.

12. Apparatus as in claim 11 and wherein the fastener receiving side and the discharge side of the dispenser are opposed, with the top of the dispenser being at the top of the dispenser and the discharging side at the bottom of the dispenser and the passages extend from the top to the bottom of the dispenser.

13. Apparatus for applying workpieces to a base at a series of worksites on the base with groups of fasteners which comprises
   a. a dispenser adapted to receive at a charging site a group of fasteners for each of the worksites of the series and serially dispensing a group of fasteners at each worksite to a workpiece applicator wherein the dispenser is capable of receiving fasteners from a fastener charger at a fastener receiving side thereof and of feeding the fasteners in groups to a discharge side of the dispenser and having a plurality of passages for fasteners extending between the receiving side and the discharge side, a plurality of gates spaced from one another at positions between the receiving side and the discharge side for selectively closing off flow of fasteners along the passages at each gate position and a gate operator for opening and closing each gate, whereby a fastener may be introduced in each passage at the receiving side and, by selective operation of the gates, held at each gate position and selectively released to flow a further distance toward or out of the passage at the discharge side of the dispenser;

b. a fastener feeder at the charging site adapted to selectively feed a series of groups of fasteners to the dispenser when the dispenser is at the charging site;

c. a workpiece applicator adapted to serially receive groups of fasteners from the dispenser and apply a respective workpiece to the base at each respective worksite with a respective group of fasteners and d. means for moving the dispenser and the workpiece applicator between the charging site and the worksites and consecutively between each of the worksites, whereby the dispenser may receive a series of groups of fasteners from the fastener feeder at the charging site, move to and consecutively between the worksites to deposit a group of fasteners at each worksite and then return to the charging site to receive a further series of fastener groups.

14. Apparatus as in claim 13 and wherein the workpiece applicator comprises an appliance adapted to serially receive groups of fasteners from the dispenser and to consecutively hold each group with the fasteners spaced apart and each fastener in the group at a predetermined location at a respective workpiece to form an application pattern at the respective worksite appropriate for fastening the workpiece against the base and wherein the dispenser is adapted to dispense each group of fasteners to the dispenser in a pattern conforming to the application pattern and the appliance is adapted to receive fasteners from the dispenser in a pattern conforming to the application pattern.

* * * * *